United States Patent
Ichikawa

(10) Patent No.: US 9,533,591 B2
(45) Date of Patent: Jan. 3, 2017

(54) VEHICULAR POWER RECEPTION DEVICE, POWER SUPPLY APPARATUS, AND ELECTRIC POWER TRANSFER SYSTEM

(75) Inventor: Shinji Ichikawa, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 225 days.

(21) Appl. No.: 14/374,308

(22) PCT Filed: Jan. 30, 2012

(86) PCT No.: PCT/JP2012/051930
§ 371 (c)(1),
(2), (4) Date: Jul. 24, 2014

(87) PCT Pub. No.: WO2013/114522
PCT Pub. Date: Aug. 8, 2013

(65) Prior Publication Data
US 2015/0069963 A1    Mar. 12, 2015

(51) Int. Cl.
*H02J 7/00* (2006.01)
*B60L 11/18* (2006.01)
(Continued)

(52) U.S. Cl.
CPC ............... *B60L 11/182* (2013.01); *B60L 1/02* (2013.01); *B60L 11/005* (2013.01); *B60L 11/14* (2013.01); *B60L 11/184* (2013.01); *B60L 11/185* (2013.01); *B60L 11/1809* (2013.01); *B60L 11/1812* (2013.01); *B60L 11/1816* (2013.01); *B60L 11/1833* (2013.01); *B60L 11/1846* (2013.01); *B60L 11/1848* (2013.01); *B60L 11/1861* (2013.01); *H02J 5/005* (2013.01);
(Continued)

(58) Field of Classification Search
CPC ..... B60L 11/182; B60L 11/1809; H02J 5/005; H02J 17/00; H02J 7/025
USPC .................................... 320/109, 108
See application file for complete search history.

(56) References Cited

U.S. PATENT DOCUMENTS 7,741,734 B2    6/2010    Joannopoulos et al.
2007/0222542 A1    9/2007    Joannopoulos et al.
(Continued)

FOREIGN PATENT DOCUMENTS

AU    2006269374 B2    1/2007
AU    2007349874 A1    10/2008
(Continued)

*Primary Examiner* — M'Baye Diao
(74) *Attorney, Agent, or Firm* — Andrews Kurth Kenyon LLP

(57) ABSTRACT

Contact charging is performed using a charging inlet and a charger, and non-contact charging is performed using a power transmission unit and a power reception unit. An ECU controls charging power by the contact charging and charging power by the non-contact charging such that the sum of the charging power by the contact charging and the charging power by the non-contact charging does not exceed a predetermined limitation. When the sum of electric power receivable by the contact charging and electric power receivable by the non-contact charging exceeds the predetermined limitation, the ECU controls the charging power by the contact charging and the charging power by the non-contact charging to limit one of the contact charging and the non-contact charging which is less efficient.

25 Claims, 15 Drawing Sheets

(51) Int. Cl.
  *B60L 1/02* (2006.01)
  *B60L 11/14* (2006.01)
  *B60L 11/00* (2006.01)
  *H02J 5/00* (2016.01)
  *H02J 7/02* (2016.01)

(52) U.S. Cl.
  CPC ........... *H02J 7/025* (2013.01); *B60L 2210/30* (2013.01); *B60L 2210/40* (2013.01); *B60L 2240/12* (2013.01); *B60L 2240/34* (2013.01); *B60L 2240/527* (2013.01); *B60L 2240/529* (2013.01); *B60L 2240/662* (2013.01); *B60L 2250/12* (2013.01); *B60L 2260/56* (2013.01); *H02J 2007/0096* (2013.01); *Y02T 10/70* (2013.01); *Y02T 10/7005* (2013.01); *Y02T 10/705* (2013.01); *Y02T 10/7022* (2013.01); *Y02T 10/7044* (2013.01); *Y02T 10/7072* (2013.01); *Y02T 10/7077* (2013.01); *Y02T 10/7241* (2013.01); *Y02T 10/7291* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/16* (2013.01); *Y02T 90/169* (2013.01); *Y04S 30/14* (2013.01)

(56) References Cited

U.S. PATENT DOCUMENTS

| | | | |
|---|---|---|---|
| 2007/0255473 A1* | 11/2007 | Christofl | B60K 17/3462 701/67 |
| 2008/0278264 A1 | 11/2008 | Karalis et al. | |
| 2009/0184700 A1* | 7/2009 | Kanayama | H02M 3/158 323/282 |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0065352 A1 | 3/2010 | Ichikawa | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |
| 2012/0043807 A1 | 2/2012 | Ichikawa | |
| 2012/0056580 A1 | 3/2012 | Kai et al. | |
| 2012/0078457 A1* | 3/2012 | Tajima | B60K 6/48 701/22 |
| 2012/0268066 A1 | 10/2012 | Endo et al. | |
| 2012/0306439 A1* | 12/2012 | Ichikawa | B60L 11/123 320/108 |

FOREIGN PATENT DOCUMENTS

| | | |
|---|---|---|
| AU | 2010200044 A1 | 1/2010 |
| CA | 2615123 A1 | 1/2007 |
| CA | 2682284 A1 | 10/2008 |
| CN | 101258658 A | 9/2008 |
| CN | 101682216 A | 3/2010 |
| CN | 101860089 A | 10/2010 |
| EP | 1902505 A2 | 3/2008 |
| EP | 2130287 A1 | 12/2009 |
| IN | 735/DELNP/2008 | 5/2008 |
| IN | 6195/DELNP/2009 | 7/2010 |
| JP | H11252810 A | 9/1999 |
| JP | 2000-299136 A | 10/2000 |
| JP | 2001008380 A1 | 1/2001 |
| JP | 2006-340541 A | 12/2006 |
| JP | 2009-501510 A | 1/2009 |
| JP | 2010070048 A | 4/2010 |
| JP | 2010288441 A | 12/2010 |
| JP | 2011-050175 A | 3/2011 |
| JP | 2011-114969 A | 6/2011 |
| JP | 2011249229 A | 12/2011 |
| KR | 20080031398 A | 4/2008 |
| KR | 20100015954 A | 2/2010 |
| WO | 2007008646 A2 | 1/2007 |
| WO | 2008118178 A1 | 10/2008 |
| WO | 2010/131348 A1 | 11/2010 |
| WO | 2010/131349 A1 | 11/2010 |
| WO | 2011024532 A1 | 3/2011 |
| WO | 2013/076803 A1 | 5/2013 |

* cited by examiner

VEHICULAR POWER RECEPTION DEVICE, POWER SUPPLY APPARATUS, AND ELECTRIC POWER TRANSFER SYSTEM

CROSS-REFERENCE TO RELATED APPLICATIONS

This is a national phase application based on the PCT International Patent Application No. PCT/JP2012/051930 filed Jan. 30, 2012, the entire contents of which are incorporated herein by reference.

TECHNICAL FIELD

The present invention relates to a vehicular power reception device, a power supply apparatus, and an electric power transfer system. In particular, the present invention relates to a vehicular power reception device, a power supply apparatus, and an electric power transfer system used for transferring electric power to a vehicle from a power source outside the vehicle.

BACKGROUND ART

International Publication No. 2010/131348 (PTD 1) discloses a vehicular charging device capable of performing both of so-called plug-in charging (conductive charging) which charges a vehicle-mounted power storage device by transmitting electric power from a power supply apparatus to a vehicle through a power line, and non-contact charging (inductive charging) which charges the power supply apparatus by transmitting electric power from the power supply apparatus to the vehicle through an electromagnetic field in a non-contact manner. In the vehicular charging device, a power reception terminal for the plug-in charging is configured to be capable of being electrically connected to an alternating current (AC) power source outside the vehicle. A charger is configured to convert AC power input from the power reception terminal into a predetermined direct current (DC) voltage. A non-contact power reception unit is configured to receive electric power from the AC power source in the non-contact manner by magnetically coupling to a power transmission unit of the AC power source. Here, the non-contact power reception unit is connected to a power conversion circuit of the charger.

With such a configuration, at least a portion of a power element constituting the power conversion circuit is commonly used for the plug-in charging and the non-contact charging. Thereby, the number of parts can be reduced when compared with a case where a charger for the plug-in charging and a charger for the non-contact charging are provided completely separately. Therefore, according to the vehicular charging device, both of the plug-in charging and the non-contact charging can be performed while suppressing cost increase (see PTD 1).

CITATION LIST

Patent Document

PTD 1: International Publication No. 2010/131348
PTD 2: International Publication No. 2010/131349

SUMMARY OF INVENTION

Technical Problem

Although the vehicular charging device described in PTD 1 can perform both of the plug-in charging and the non-contact charging and is useful, PTD 1 does not specifically consider how to use the plug-in charging and the non-contact charging each properly depending on the situation. In particular, PTD 1 does not specifically consider power control in a case where the plug-in charging and the non-contact charging are performed simultaneously.

Accordingly, one object of the present invention is to provide a power control technique in a vehicular power reception device, a power supply apparatus, and an electric power transfer system capable of performing plug-in charging and non-contact charging simultaneously.

Solution to Problem

According to the present invention, a vehicular power reception device is a vehicular power reception device for receiving electric power from a power source outside a vehicle (hereinafter also referred to as an "outside power source"), including first and second power reception units and a control unit. The first power reception unit receives the electric power from the outside power source via a power line. The second power reception unit receives the electric power from the outside power source in a non-contact manner. The control unit controls first electric power indicative of the electric power received by the first power reception unit and second electric power indicative of the electric power received by the second power reception unit such that the electric power received from the outside power source does not exceed electric power receivable by the vehicle.

Preferably, the control unit controls the first electric power and the second electric power based on a sum of the first electric power and the second electric power.

Preferably, the control unit controls the first electric power and the second electric power such that the sum of the first electric power and the second electric power does not exceed a predetermined limitation.

Preferably, when a sum of electric power receivable by the first power reception unit and electric power receivable by the second power reception unit is less than or equal to the predetermined limitation, the control unit controls the first electric power and the second electric power to receive the electric power from the outside power source using both of the first and second power reception units.

Preferably, when a sum of electric power receivable by the first power reception unit and electric power receivable by the second power reception unit exceeds the predetermined limitation, the control unit controls the first electric power and the second electric power to limit one of power reception by the first power reception unit and power reception by the second power reception unit which is less efficient.

Preferably, the vehicular power reception device further includes a power storage device. The power storage device is charged by the first electric power and the second electric power. The predetermined limitation is allowable input power indicative of electric power inputtable to the power storage device.

Preferably, the predetermined limitation is set based on electric power receivable from the outside power source.

Preferably, when power reception using both of the first and second power reception units is requested, the control unit starts power reception by the second power reception unit prior to power reception by the first power reception unit.

Preferably, when power reception using both of the first and second power reception units is requested, the control unit starts power reception by the second power reception unit after preparation for the power reception by the second power reception unit is completed and before preparation for the power reception by the first power reception unit is completed.

Preferably, the vehicular power reception device further includes a power storage device. The power storage device is charged by the first electric power and the second electric power. The control unit performs full charging control in which charging power for the power storage device is reduced when a state of charge (SOC) of the power storage device reaches a predetermined amount indicating that the SOC comes close to a fully charged state, and limits power reception by the second power reception unit when performing the full charging control.

Preferably, the vehicular power reception device further includes an electrically powered air-conditioning device. The electrically powered air-conditioning device can perform pre-air-conditioning which conditions air in a vehicle interior before a user uses the vehicle. During heating by the pre-air-conditioning, the control unit performs power reception by the first power reception unit.

Preferably, the vehicular power reception device further includes an electrically powered air-conditioning device. The electrically powered air-conditioning device can perform pre-air-conditioning which conditions air in a vehicle interior before a user uses the vehicle. During cooling by the pre-air-conditioning, the control unit performs power reception by the second power reception unit.

Preferably, the outside power source includes a power transmission unit transmitting electric power to the second power reception unit in the non-contact manner. A difference between a natural frequency of the second power reception unit and a natural frequency of the power transmission unit is less than or equal to ±10% of the natural frequency of the second power reception unit or the natural frequency of the power transmission unit.

Preferably, the outside power source includes a power transmission unit transmitting electric power to the second power reception unit in the non-contact manner. A coupling coefficient between the second power reception unit and the power transmission unit is less than or equal to 0.1.

Preferably, the outside power source includes a power transmission unit transmitting electric power to the second power reception unit in the non-contact manner. The second power reception unit receives the electric power from the power transmission unit through at least one of a magnetic field and an electric field, the magnetic field being formed between the second power reception unit and the power transmission unit, the electric field being formed between the second power reception unit and the power transmission unit. The magnetic field and the electric field are formed between the second power reception unit and the power transmission unit, and oscillate at a specific frequency.

Further, according to the present invention, a power supply apparatus is a power supply apparatus for supplying electric power to a vehicle, including first and second power transmission units and a control unit. The first power transmission unit transmits the electric power to the vehicle via a power line. The second power transmission unit transmits the electric power to the vehicle in a non-contact manner. The control unit controls first electric power indicative of the electric power transmitted by the first power transmission unit and second electric power indicative of the electric power transmitted by the second power transmission unit such that the electric power transmitted to the vehicle does not exceed electric power receivable by the vehicle.

Preferably, the control unit controls the first electric power and the second electric power based on a sum of the first electric power and the second electric power.

Preferably, the control unit controls the first electric power and the second electric power such that the sum of the first electric power and the second electric power does not exceed a predetermined limitation.

Preferably, when a sum of electric power transmittable by the first power transmission unit and electric power transmittable by the second power transmission unit is less than or equal to the predetermined limitation, the control unit controls the first electric power and the second electric power to transmit the electric power to the vehicle using both of the first and second power transmission units.

Preferably, when a sum of electric power transmittable by the first power transmission unit and electric power transmittable by the second power transmission unit exceeds the predetermined limitation, the control unit controls the first electric power and the second electric power to limit one of power transmission by the first power transmission unit and power transmission by the second power transmission unit which is less efficient.

Preferably, when power transmission using both of the first and second power transmission units is requested, the control unit starts power transmission by the second power transmission unit prior to power transmission by the first power transmission unit.

Preferably, when power transmission using both of the first and second power transmission units is requested, the control unit starts power transmission by the second power transmission unit after preparation for the power transmission by the second power transmission unit is completed and before preparation for the power transmission by the first power transmission unit is completed.

Preferably, the vehicle includes a power storage device and a full charging control unit. The power storage device is charged by the first electric power and the second electric power. The full charging control unit performs full charging control in which charging power for the power storage device is reduced when an SOC of the power storage device reaches a predetermined amount indicating that the SOC comes close to a fully charged state. The control unit limits power transmission by the second power transmission unit when the full charging control is performed.

Preferably, the vehicle includes a power reception unit receiving electric power from the second power transmission unit in the non-contact manner. A difference between a natural frequency of the second power transmission unit and a natural frequency of the power reception unit is less than or equal to ±10% of the natural frequency of the second power transmission unit or the natural frequency of the power reception unit.

Preferably, the vehicle includes a power reception unit receiving electric power from the second power transmission unit in the non-contact manner. A coupling coefficient between the second power transmission unit and the power reception unit is less than or equal to 0.1.

Preferably, the vehicle includes a power reception unit receiving electric power from the second power transmission unit in the non-contact manner. The second power transmission unit transmits the electric power to the power reception unit through at least one of a magnetic field and an electric field, the magnetic field being formed between the second power transmission unit and the power reception unit, the electric field being formed between the second power transmission unit and the power reception unit. The magnetic field and the electric field are formed between the second power transmission unit and the power reception unit, and oscillate at a specific frequency.

Further, according to the present invention, an electric power transfer system is an electric power transfer system for transferring electric power from a power supply apparatus to a vehicle, including first and second power transmission/reception unit and a control unit. The first power transmission/reception unit transfers the electric power from the power supply apparatus to the vehicle via a power line. The second power transmission/reception unit transfers the electric power from the power supply apparatus to the vehicle in a non-contact manner. The control unit controls first electric power indicative of the electric power transferred by the first power transmission/reception unit and second electric power indicative of the electric power transferred by the second power transmission/reception unit such that the electric power transferred from the power supply apparatus to the vehicle does not exceed electric power receivable by the vehicle.

Preferably, the control unit controls the first electric power indicative of the electric power transferred by the first power transmission/reception unit and the second electric power indicative of the electric power transferred by the second power transmission/reception unit, based on a sum of the first electric power and the second electric power.

Advantageous Effects of Invention

According to the present invention, the first electric power by plug-in charging and the second electric power by non-contact charging are controlled such that the electric power received from the outside power source does not exceed electric power receivable by the vehicle. Therefore, the power storage device can be charged by using the plug-in charging and the non-contact charging each properly depending on the situation under conditions appropriate to user advantages, while suppressing excessive input to the power storage device, excessive power reception from the outside power source, and the like.

DESCRIPTION OF EMBODIMENTS

Figure 1:
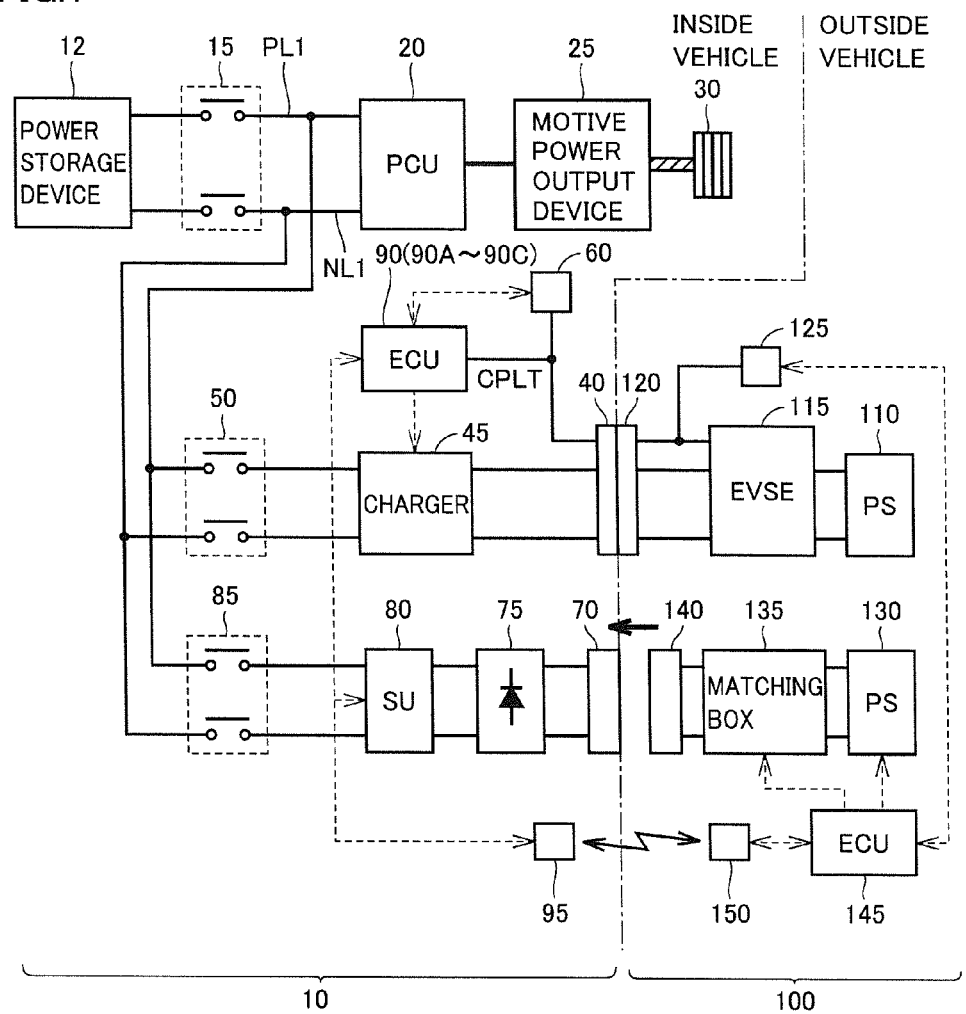
FIG. 1 is an overall configuration diagram of a vehicle charging system in accordance with Embodiment 1 of the present invention.

Hereinafter, embodiments of the present invention will be described in detail with reference to the drawings, in which identical or corresponding parts will be designated by the same reference numerals, and the description thereof will not be repeated.

Embodiment 1

FIG. 1 is an overall configuration diagram of a vehicle charging system in accordance with Embodiment 1 of the present invention. Referring to FIG. 1, the vehicle charging system includes a vehicle 10 and a power supply apparatus 100. Vehicle 10 includes a power storage device 12, a system main relay (hereinafter referred to as an "SMR") 15, a power control unit (hereinafter referred to as a "PCU") 20, a motive power output device 25, and drive wheels 30.

Power storage device 12 is a rechargeable DC power source, and is composed of, for example, a secondary battery such as a nickel hydride battery or a lithium ion battery. In power storage device 12, electric power supplied from outside power sources 110, 130 (described later) of power supply apparatus 100 and electric power generated in motive power output device 25 are stored. A large-capacity capacitor may also be adopted as power storage device 12. SMR 15 is provided between power storage device 12 and a positive electrode line PL1, a negative electrode line NL1.

SMR 15 is a relay for electrically connecting/disconnecting power storage device 12 to/from positive electrode line PL1, negative electrode line NL1.

PCU 20 collectively indicates a power conversion device for receiving electric power from power storage device 12 and driving motive power output device 25. For example, PCU 20 includes an inverter for driving a motor included in motive power output device 25, a converter boosting electric power output from power storage device 12, and the like. Motive power output device 25 collectively indicates a device for driving drive wheels 30. For example, motive power output device 25 includes a motor driving drive wheels 30, an engine, and the like. Further, motive power output device 25 generates electric power by the motor driving drive wheels 30 during braking of the vehicle and the like, and outputs the generated electric power to PCU 20.

Vehicle 10 further includes a charging inlet 40, a charger 45, and a first charging relay 50. Charging inlet 40 is configured to be connectable to a connector 120 of a charging cable supplying electric power from outside power source 110 of power supply apparatus 100 to vehicle 10. When power storage device 12 is charged by outside power source 110, charging inlet 40 receives the electric power supplied from outside power source 110 via the charging cable. Hereinafter, charging of power storage device 12 by outside power source 110 using the charging cable will also be referred to as "contact charging".

Charger 45 is connected to positive electrode line PL1, negative electrode line NL1 provided between SMR 15 and PCU 20, via first charging relay 50. When the contact charging is performed, charger 45 converts the electric power supplied from outside power source 110 into charging power for power storage device 12, based on a control signal from an ECU 90 (described later). Then, the electric power output from charger 45 is supplied to power storage device 12 to charge power storage device 12. First charging relay 50 is provided between charger 45 and positive electrode line PL1, negative electrode line NL1 to electrically connect/disconnect charger 45 to/from positive electrode line PL1, negative electrode line NL1.

Vehicle 10 further includes a power reception unit 70, a rectifier 75, a sensor unit 80, a second charging relay 85, electronic control unit (hereinafter referred to as an "ECU") 90, a first communication device 60, and a second communication device 95. Power reception unit 70 receives AC power output from a power transmission unit 140 (described later) of power supply apparatus 100 in a non-contact manner, when power storage device 12 is charged by outside power source 130 of power supply apparatus 100. Hereinafter, charging of power storage device 12 by outside power source 130 using power reception unit 70 and power transmission unit 140 will also be referred to as "non-contact charging".

Rectifier 75 rectifies the AC power received by power reception unit 70. Sensor unit 80 detects a received voltage and a received current output from rectifier 75, and outputs them to ECU 90. It is noted that sensor unit 80 is provided with an adjustment resistor for keeping an impedance on the vehicle 10 side constant when adjustment control such as alignment and impedance matching between power reception unit 70 and power transmission unit 140 of power supply apparatus 100, which is performed prior to the non-contact charging, is performed. Second charging relay 85 is provided between sensor unit 80 and positive electrode line PL1, negative electrode line NL1 to electrically connect/disconnect sensor unit 80 to/from positive electrode line PL1, negative electrode line NL1.

It is noted that configurations of power reception unit 70 and sensor unit 80 will be described later, together with configurations of power transmission unit 140 and a matching box 135 on the power supply apparatus 100 side, and non-contact electric power transmission from power transmission unit 140 to power reception unit 70.

ECU 90 controls the contact charging and the non-contact charging, through software processing performed by executing a prestored program in a CPU (Central Processing Unit) and/or hardware processing performed by dedicated electronic circuitry.

Specifically, when the contact charging is performed, ECU 90 performs an operation of turning on/off first charging relay 50 and a breaker included in an EVSE (Electric Vehicle Supply Equipment) 115 of power supply apparatus 100. For the operation of EVSE 115, ECU 90 remotely operates EVSE 115 by manipulating a potential of a pilot signal CPLT received from EVSE 115 via a control pilot line of the charging cable. Then, ECU 90 generates a command to start/stop charger 45, a power command indicating a target value of the charging power by the contact charging, and the like, and outputs them to charger 45.

Further, before the non-contact charging is performed, ECU 90 performs the adjustment control such as alignment and impedance matching between power reception unit 70 and power transmission unit 140 of power supply apparatus 100. Specifically, when the adjustment control for the non-contact charging is performed, ECU 90 outputs a command to sensor unit 80 to connect the adjustment resistor in sensor unit 80 to a circuit. When the adjustment control is finished, ECU 90 outputs an ON command to second charging relay 85. Thereby, the non-contact charging can be performed.

Further, ECU 90 performs power control at the time of the contact charging and the non-contact charging such that the electric power received from power supply apparatus 100 does not exceed electric power receivable by vehicle 10. Specifically, ECU 90 controls charging power by the contact charging using charger 45 and charging power by the non-contact charging using power reception unit 70 such that the sum of the charging power by the contact charging and the charging power by the non-contact charging does not exceed a predetermined limitation. The predetermined limitation is, for example, inputtable power Win indicative of electric power inputtable to power storage device 12. Instead of inputtable power Win for power storage device 12, the predetermined limitation may be set based on electric power receivable from the outside power source. For example, a limitation on the outside power source (for example, contracted electric power in a case where power supply apparatus 100 is a house) may be set as the predetermined limitation. The power control will be described in detail later.

First communication device 60 is a communication interface for communicating information about the contact charging with the outside of the vehicle (power supply apparatus 100). In Embodiment 1, first communication device 60 communicates with power supply apparatus 100 via the charging cable (such communication via the charging cable will also be referred to as "power line communication (PLC)"). As an example, first communication device 60 is connected to the control pilot line of the charging cable, and communicates with power supply apparatus 100 via the control pilot line.

Second communication device 95 is a communication interface for communicating information about the non-contact charging with the outside of the vehicle (power supply apparatus 100). Second communication device 95 wirelessly communicates with power supply apparatus 100.

It is noted that it is not necessarily required to provide both of first and second communication devices 60, 95, and first and second communication devices 60, 95 may be configured as one communication device to perform PLC or wireless communication.

On the other hand, power supply apparatus 100 includes outside power source 110, EVSE 115, and connector 120. Outside power source 110 is composed of, for example, a commercial system power source. However, outside power source 110 is not limited thereto, and various power sources can be applied. EVSE 115 is configured to be capable of breaking an electrical path for supplying electric power from outside power source 110 to vehicle 10. EVSE 115 is provided in the charging cable for supplying electric power from outside power source 110 to vehicle 10, or a charging stand for supplying electric power to vehicle 10 via the charging cable. EVSE 115 generates pilot signal CPLT for exchanging predetermined information with vehicle 10, and outputs it to vehicle 10 via the control pilot line. It is noted that the potential of pilot signal CPLT is manipulated in ECU 90 of vehicle 10, and EVSE 115 switches connection/breaking of the charging electrical path based on the potential of pilot signal CPLT.

Connector 120 is connected to the charging cable including the control pilot line, and is configured to be capable of fitting into charging inlet 40 of vehicle 10.

Power supply apparatus 100 further includes outside power source 130, matching box 135, power transmission unit 140, an ECU 145, a third communication device 125, and a fourth communication device 150. Outside power source 130 generates AC power having a predetermined frequency. As an example, outside power source 130 receives electric power from a commercial system power source, and generates high-frequency AC power. It is noted that outside power sources 110, 130 may be configured as one power source apparatus.

Matching box 135 is provided between outside power source 130 and power transmission unit 140, and is configured to be capable of changing an impedance therein. As an example, matching box 135 is composed of variable capacitors and a coil, and can change the impedance by changing capacitances of the variable capacitors. By changing the impedance in matching box 135, the impedance of power supply apparatus 100 can be matched to the impedance of vehicle 10 (impedance matching). It is noted that, in a case where outside power source 130 has a function of matching the impedances, matching box 135 can be omitted.

Power transmission unit 140 receives supply of the AC power from outside power source 130. Then, power transmission unit 140 outputs electric power to power reception unit 70 of vehicle 10 in the non-contact manner, via an electromagnetic field generated around power transmission unit 140. It is noted that the configurations of power transmission unit 140 and matching box 135 will be described later, together with the configurations of power reception unit 70 and sensor unit 80 on the vehicle 10 side, and the non-contact electric power transmission from power transmission unit 140 to power reception unit 70.

Third communication device 125 is a communication interface for communicating the information about the contact charging with vehicle 10. In Embodiment 1, third communication device 125 communicates with vehicle 10 via the charging cable. As an example, third communication device 125 is connected to the control pilot line of the charging cable, and communicates with first communication device 60 of vehicle 10 via the control pilot line.

Fourth communication device 150 is a communication interface for communicating the information about the non-contact charging with vehicle 10. Fourth communication device 150 wirelessly communicates with vehicle 10. It is noted that it is not necessarily required to provide both of third and fourth communication devices 125, 150, and third and fourth communication devices 125, 150 may be configured as one communication device to perform PLC or wireless communication.

ECU 145 controls outside power source 130 and matching box 135, through software processing performed by executing a prestored program in a CPU and/or hardware processing performed by dedicated electronic circuitry. Specifically, when the adjustment control, which is performed prior to performing the non-contact charging, is performed, ECU 145 controls outside power source 130 to output adjustment power smaller than the power for charging power storage device 12, and controls matching box 135 to perform impedance matching. When the adjustment control is finished, ECU 145 controls outside power source 130 to output the power for charging power storage device 12.

In the vehicle charging system, the contact charging using charging inlet 40 and charger 45 and the non-contact charging using power transmission unit 140 and power reception unit 70 can be performed. The charging power by the contact charging and the charging power by the non-contact charging are controlled such that the sum of the charging power by the contact charging and the charging power by the non-contact charging does not exceed inputtable power Win for power storage device 12.

Figure 2:
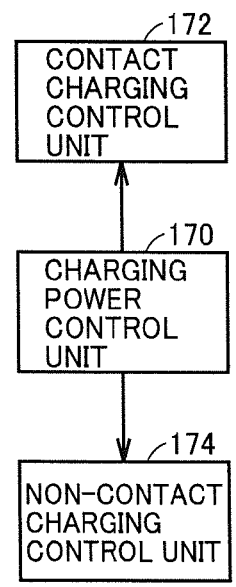
FIG. 2 is a functional block diagram of a portion related to charging control, of an ECU mounted in a vehicle shown in FIG. 1.

FIG. 2 is a functional block diagram of a portion related to charging control, of ECU 90 mounted in vehicle 10 shown in FIG. 1. Referring to FIG. 2, ECU 90 includes a charging power control unit 170, a contact charging control unit 172, and a non-contact charging control unit 174.

Charging power control unit 170 controls the charging power by the contact charging and the charging power by the non-contact charging. Specifically, charging power control unit 170 controls charging power Pc by the contact charging and charging power Pw by the non-contact charging such that the sum of charging power Pc and charging power Pw does not exceed allowable input power Win for power storage device 12.

Figure 3:
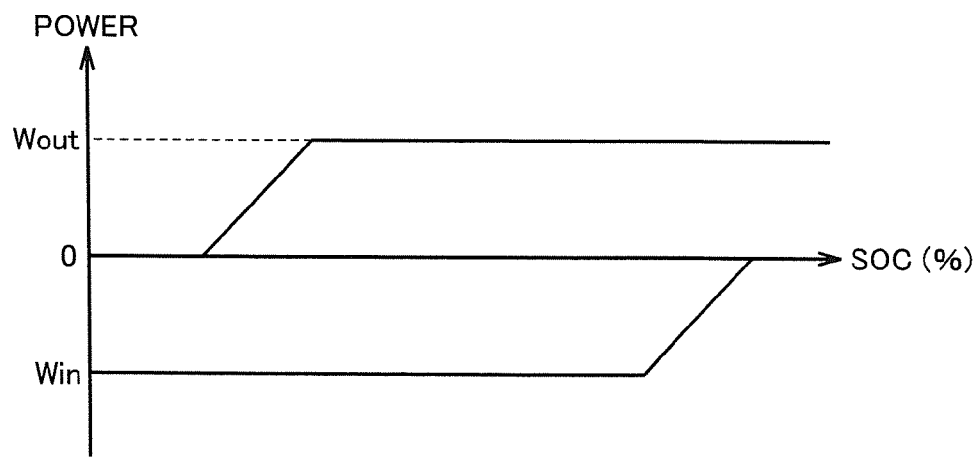
FIG. 3 is a view showing allowable input power for a power storage device.

FIG. 3 is a view showing allowable input power Win for power storage device 12. FIG. 3 also shows outputtable power Wout indicative of electric power outputtable from power storage device 12. Referring to FIG. 3, the axis of abscissas represents the state of charge of power storage device 12 (hereinafter referred to as the "SOC", and indicated by a percentage (%) relative to the capacity of power storage device 12), and the axis of ordinates represents charging/discharging power for power storage device 12. It is noted that electric power having a positive value indicates discharging, and electric power having a negative value indicates charging.

As shown in FIG. 3, when the SOC exceeds a predetermined value, allowable input power Win is reduced to prevent overcharging of power storage device 12. When the SOC is less than a predetermined value, outputtable power Wout is reduced to prevent overdischarging of power storage device 12. Further, although not particularly shown, allowable input power Win and outputtable power Wout also vary depending on the temperature of power storage device 12 and the like. Charging power Pc by the contact charging and charging power Pw by the non-contact charging are controlled such that the sum of charging power Pc and charging power Pw does not exceed allowable input power Win.

Referring to FIG. 2 again, more specifically, charging power control unit 170 compares a value obtained by summing maximum power Pc_max indicative of an upper limit of charging power Pc by the contact charging and maximum power Pw_max indicative of an upper limit of charging power Pw by the non-contact charging, with allowable input power Win for power storage device 12. It is noted that information about maximum power Pc_max and maximum power Pw_max is obtained from power supply apparatus 100, using first communication device 60 and second communication device 95. When the summed value of maximum power Pc_max and maximum power Pw_max is less than or equal to allowable input power Win, charging power control unit 170 outputs a power command to contact charging control unit 172 to set charging power Pc equal to maximum power Pc_max, and outputs a power command to non-contact charging control unit 174 to set charging power Pw equal to maximum power Pw_max.

On the other hand, when the summed value of maximum power Pc_max and maximum power Pw_max exceeds allowable input power Win, charging power control unit 170 controls charging power Pc and charging power Pw such that the sum of charging power Pc and charging power Pw does not exceed allowable input power Win, by limiting one of power reception by the contact charging and power reception by the non-contact charging which is less efficient. Various indicators can be used to indicate the "efficiency", and the "efficiency" of the contact charging and the "efficiency" of the non-contact charging can be compared with each other based on, for example, the efficiency in terms of cost (power cost), the efficiency in terms of electric power transmission (electric power transmission efficiency), the efficiency in terms of the amount of carbon dioxide ($CO_2$) emitted when electric power is generated (the amount of $CO_2$), or the like. It is noted that limiting the one which is less efficient includes both of reducing (limiting) the charging power which is less efficient, and stopping the charging which is less efficient.

Based on the power command received from charging power control unit 170, contact charging control unit 172 generates a drive signal for driving charger 45, and outputs the generated drive signal to charger 45. Based on the power command received from charging power control unit 170, non-contact charging control unit 174 generates a signal for controlling output power of outside power source 130 (FIG. 1), and transmits the generated signal to power supply apparatus 100 via second communication device 95.

Figure 4:
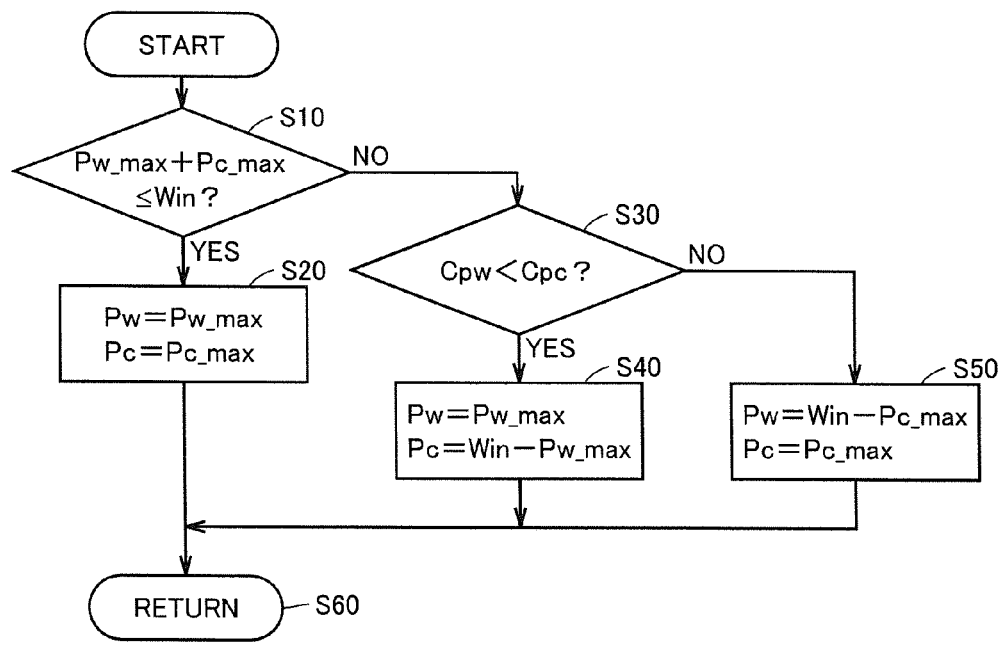
FIG. 4 is a flowchart for illustrating a processing procedure of power control performed by the ECU.

FIG. 4 is a flowchart for illustrating a processing procedure of power control performed by ECU 90. The processing in this flowchart is called from a main routine and executed repeatedly at regular time intervals or whenever a predetermined condition is satisfied.

Referring to FIG. 4, ECU 90 determines whether or not the sum of maximum power Pw_max indicative of the upper limit of charging power Pw by the non-contact charging and maximum power Pc_max indicative of the upper limit of charging power Pc by the contact charging is less than or equal to allowable input power Win for power storage device 12 (step S10).

When ECU 90 determines in step S10 that the sum of maximum power Pw_max and maximum power Pc_max is less than or equal to allowable input power Win (YES in step S10), ECU 90 controls charging power Pw by the non-contact charging such that charging power Pw becomes equal to maximum power Pw_max, and controls charging power Pc by the contact charging such that charging power Pc becomes equal to maximum power Pc_max (step S20).

When ECU 90 determines in step S10 that the sum of maximum power Pw_max and maximum power Pc_max is more than allowable input power Win (NO in step S10), ECU 90 determines whether or not power cost Cpw of the non-contact charging is lower than power cost Cpc of the contact charging (step S30). It is noted that information about power cost Cpw and power cost Cpc is obtained from power supply apparatus 100, using first communication device 60 and second communication device 95.

When ECU 90 determines in step S30 that power cost Cpw of the non-contact charging is lower than power cost Cpc of the contact charging (YES in step S30), ECU 90 limits power reception by the contact charging having higher power cost. For example, ECU 90 controls charging power Pw by the non-contact charging such that charging power Pw becomes equal to maximum power Pw_max, and controls charging power Pc by the contact charging such that charging power Pc becomes equal to a value obtained by subtracting maximum power Pw_max of the non-contact charging from allowable input power Win for power storage device 12 (step S40).

On the other hand, when ECU 90 determines in step S30 that power cost Cpw of the non-contact charging is more than or equal to power cost Cpc of the contact charging (NO in step S30), ECU 90 limits power reception by the non-contact charging having higher power cost. For example, ECU 90 controls charging power Pw by the non-contact charging such that charging power Pw becomes equal to a value obtained by subtracting maximum power Pc_max of the contact charging from allowable input power Win for power storage device 12, and controls charging power Pc by the contact charging such that charging power Pc becomes equal to maximum power Pc_max (step S50).

Figure 5:
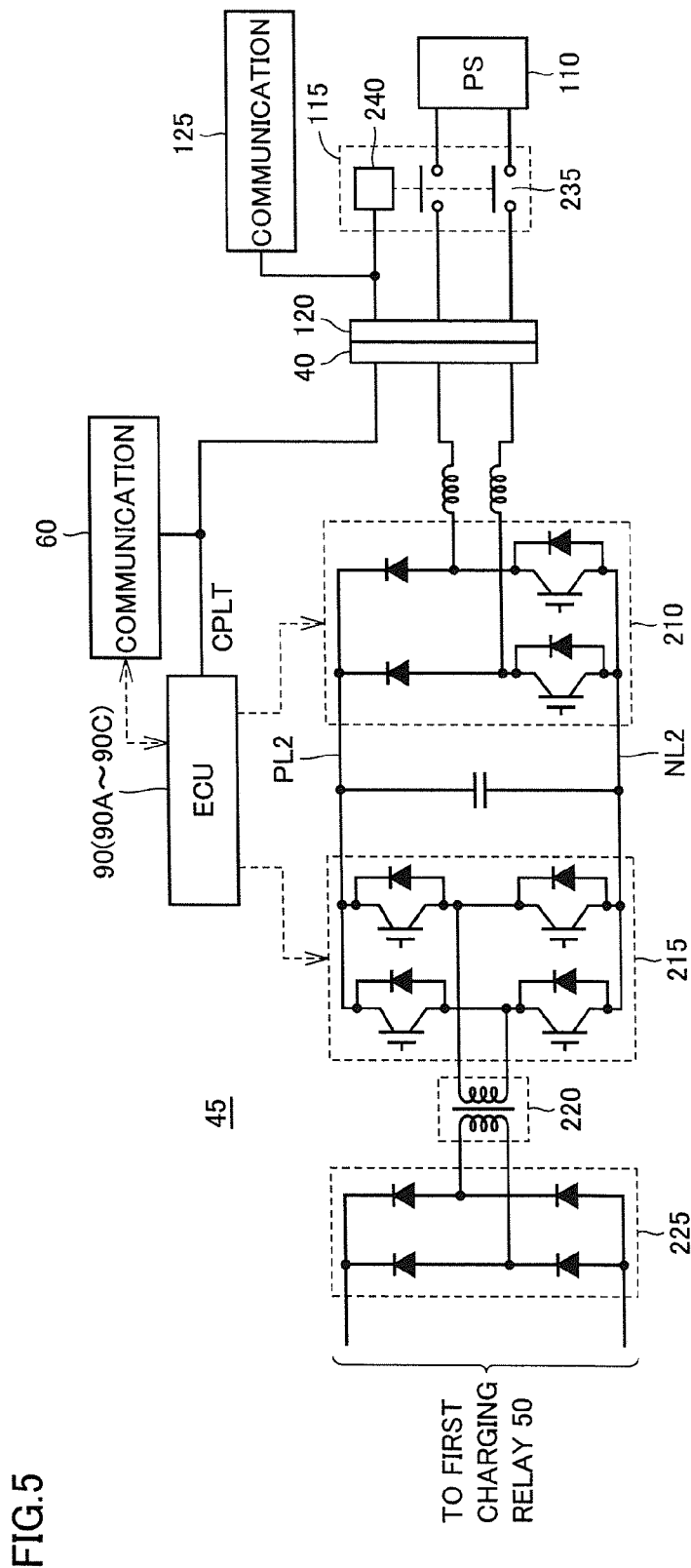
FIG. 5 is a circuit diagram of a charger and an EVSE for performing contact charging.

FIG. 5 is a circuit diagram of charger 45 and EVSE 115 for performing the contact charging. It is noted that the configuration shown in FIG. 5 is merely an example, and the configuration for performing the contact charging is not limited to the configuration of FIG. 5. Referring to FIG. 5, charger 45 includes an AC/DC conversion unit 210, a DC/AC conversion unit 215, an insulating transformer 220, and a rectification unit 225.

AC/DC conversion unit 210 converts AC power supplied from outside power source 110 into DC power and outputs the DC power to DC/AC conversion unit 215, based on a control signal from ECU 90. It is noted that AC/DC conversion unit 210 and a reactor provided on an input side of AC/DC conversion unit 210 can constitute a boost chopper circuit to boost electric power input from charging inlet 40. DC/AC conversion unit 215 converts the DC power received from AC/DC conversion unit 210 into AC power and outputs the AC power to insulating transformer 220, based on a control signal from ECU 90. DC/AC conversion unit 215 is composed of, for example, a single-phase bridge circuit.

Insulating transformer 220 includes a core made of a magnetic material, and a primary coil and a secondary coil wound around the core. The primary coil and the secondary coil are electrically insulated from each other, and are connected to DC/AC conversion unit 215 and rectification unit 225, respectively. Insulating transformer 220 converts the AC power from DC/AC conversion unit 215 to have a voltage in accordance with a turn ratio between the primary coil and the secondary coil, and outputs the AC power to rectification unit 225. Rectification unit 225 converts the AC power received from insulating transformer 220 into DC power and outputs the DC power to first charging relay 50.

It is noted that AC/DC conversion unit 210 and rectification unit 225 may each be composed of a single-phase bridge circuit capable of performing power conversion bi-directionally. This also allows vehicle 10 to output electric power to the outside of the vehicle.

On the other hand, EVSE 115 includes a CCID (Charging Circuit Interrupt Device) 235 and a CPLT control device 240. CCID 235 is a breaker provided in a power supply path from outside power source 110 to vehicle 10, and is controlled by CPLT control device 240. CPLT control device 240 generates pilot signal CPLT for exchanging predetermined information between EVSE 115 and vehicle 10 when the contact charging is performed, and outputs it to vehicle 10 via the control pilot line.

The potential of pilot signal CPLT is manipulated in ECU 90 of vehicle 10, and CPLT control device 240 controls CCID 235 based on the potential of pilot signal CPLT. Specifically, CCID 235 can be remotely operated from vehicle 10 by manipulating the potential of pilot signal CPLT in vehicle 10. It is noted that pilot signal CPLT conforms to, for example, "SAE J1772 (SAE Electric Vehicle Conductive Charge Coupler)" in the United States.

First communication device 60 of vehicle 10 is connected to the control pilot line, through which pilot signal CPLT is exchanged, on the vehicle 10 side, and third communication device 125 of power supply apparatus 100 is connected to the control pilot line on the power supply apparatus 100 side. Thereby, when the contact charging is performed, the information about the contact charging (for example, information about maximum power Pc_max of the contact charging) is communicated between first communication device 60 and third communication device 125 via the charging cable (control pilot line).

Figure 6:
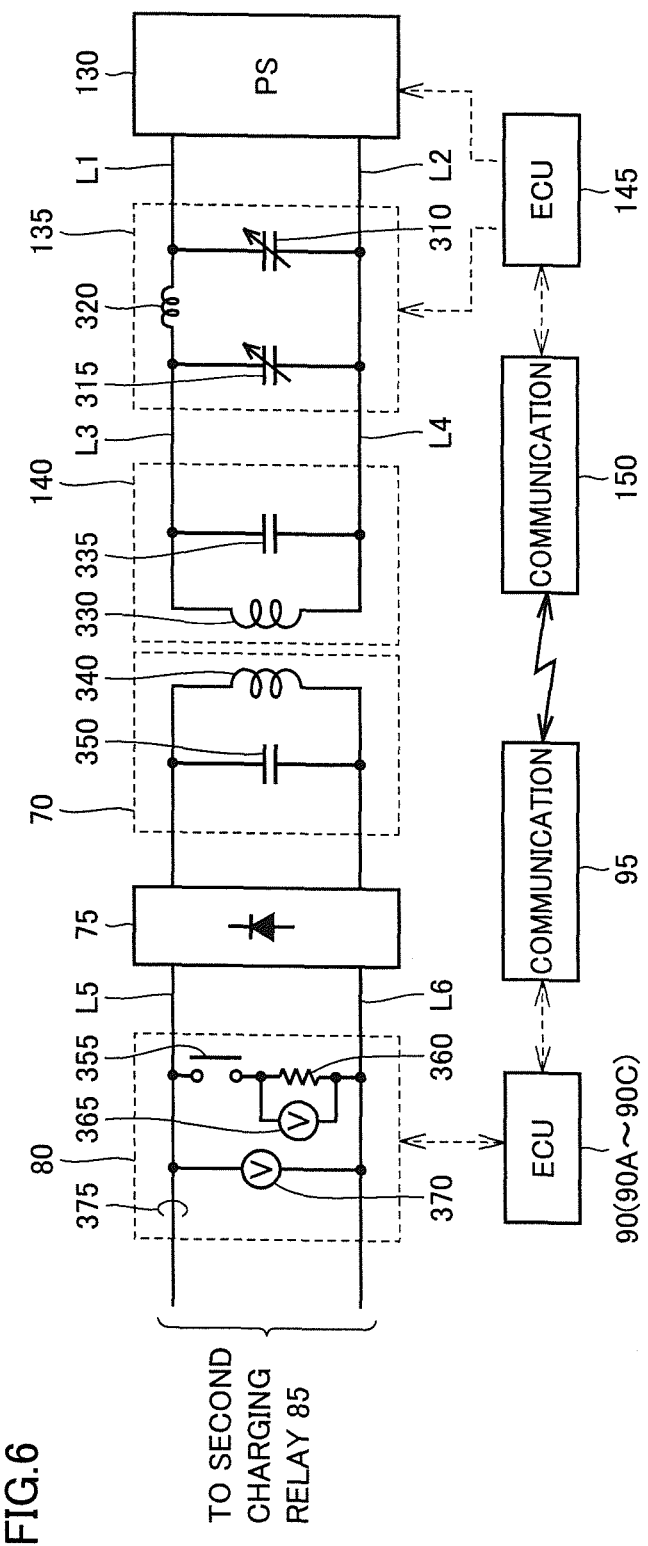
FIG. 6 is a circuit diagram of a power reception unit and a sensor unit, and a matching box and a power transmission unit for performing non-contact charging.

FIG. 6 is a circuit diagram of power reception unit 70 and sensor unit 80, and matching box 135 and power transmission unit 140 for performing the non-contact charging. It is noted that the configuration shown in FIG. 6 is also merely an example, and the configuration for performing the non-contact charging is not limited to the configuration of FIG. 6. Referring to FIG. 6, power reception unit 70 includes a coil 340 and a capacitor 350.

Coil 340 and capacitor 350 form a resonance circuit to receive electric power transmitted from power transmission unit 140 in the non-contact manner. Rectifier 75 rectifies AC power received by coil 340, and outputs it to power lines L5, L6. It is noted that, although not particularly shown, coil 340 and capacitor 350 may form a closed loop, and an additional coil which takes out the AC power received by coil 340 from coil 340 by electromagnetic induction and outputs it to rectifier 75 may be provided.

Sensor unit 80 includes a relay 355, an adjustment resistor 360, voltage sensors 365, 370, and a current sensor 375. Relay 355 and adjustment resistor 360 are connected in series between power lines L5 and L6. Relay 355 is turned on (i.e., becomes conductive) when the adjustment control, which is performed prior to the non-contact charging, is performed. Thereby, the impedance on the vehicle 10 side at the time of the adjustment control becomes constant, and the adjustment control can be performed efficiently.

Voltage sensor 365 detects a voltage of adjustment resistor 360, and outputs it to ECU 90. Voltage sensor 370 detects a voltage between power lines L5 and L6, i.e., a charging voltage for power storage device 12 at the time of the non-contact charging, and outputs a detected value thereof to ECU 90. Current sensor 375 detects a current flowing through power line L5 (or power line L6), i.e., a charging current for power storage device 12 at the time of the non-contact charging, and outputs a detected value thereof to ECU 90.

On the other hand, matching box 135 of power supply apparatus 100 includes variable capacitors 310, 315 and a coil 320. Matching box 135 can change the impedance by changing capacitances of variable capacitors 310, 315. By changing the impedance in matching box 135, the impedance of power supply apparatus 100 can be matched to the impedance of vehicle 10 (impedance matching). It is noted that, in a case where outside power source 130 has a function of matching the impedances, matching box 135 can be omitted.

Power transmission unit 140 includes a coil 330 and a capacitor 335. Coil 330 and capacitor 335 form a resonance circuit to transmit AC power supplied from outside power source 130 to power reception unit 70 of vehicle 10 in the non-contact manner. It is noted that, although not particularly shown, coil 330 and capacitor 335 may form a closed loop, and an additional coil which supplies coil 330 with the AC power output from outside power source 130, by electromagnetic induction, may be provided.

It is noted that capacitors 335, 350 are each provided to adjust a natural frequency of the resonance circuit, and capacitors 335, 350 may not be provided in a case where a desired natural frequency is obtained using a stray capacitance of each of coils 330, 340.

Hereinafter, the non-contact electric power transmission from power transmission unit 140 to power reception unit 70 will be described in detail. In this electric power transmission system, a difference between a natural frequency of power transmission unit 140 and a natural frequency of power reception unit 70 is less than or equal to ±10% of the natural frequency of power transmission unit 140 or the natural frequency of power reception unit 70. Electric power transmission efficiency can be improved by setting the natural frequencies of power transmission unit 140 and power reception unit 70 in such a range. On the other hand, if the above difference between the natural frequencies is more than ±10%, electric power transmission efficiency becomes less than 10%, causing problems such as an increased electric power transmission time.

It is noted that the natural frequency of power reception unit 70 (power transmission unit 140) refers to an oscillation frequency at which an electrical circuit (resonance circuit) constituting power reception unit 70 (power transmission unit 140) freely oscillates. A resonance frequency of power reception unit 70 (power transmission unit 140) refers to a natural frequency obtained when a braking force or an electric resistance is set to zero in the electrical circuit (resonance circuit) constituting power reception unit 70 (power transmission unit 140).

Figure 7:
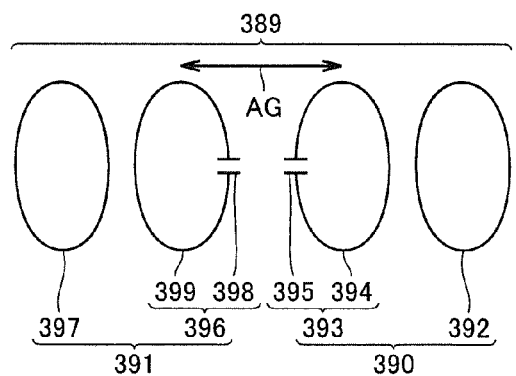
FIG. 7 is a view showing a simulation model of an electric power transmission system.
Figure 8:
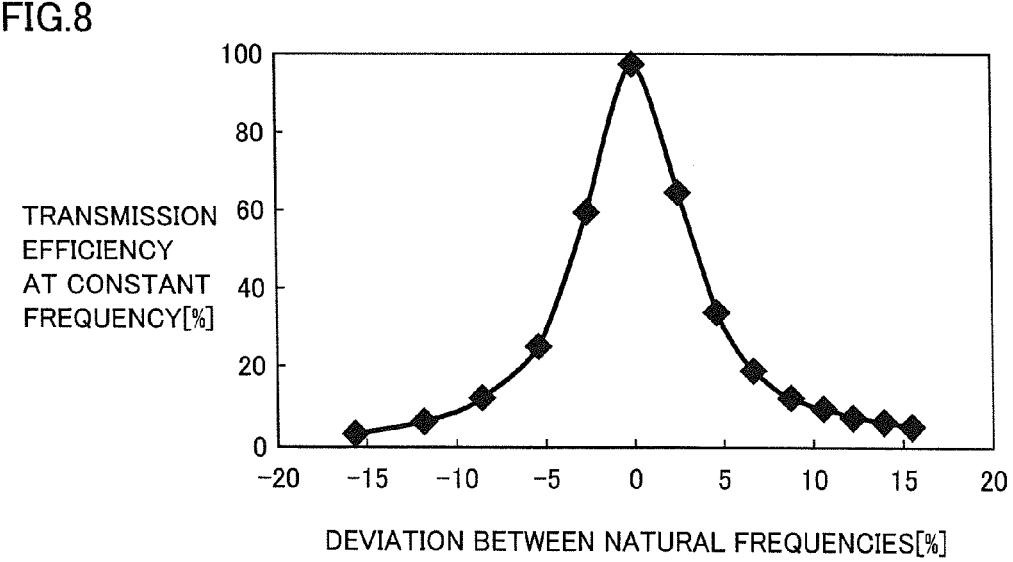
FIG. 8 is a view showing the relation between deviation between natural frequencies of the power transmission unit and the power reception unit and electric power transmission efficiency.

The result of a simulation for analyzing the relation between the difference between the natural frequencies and electric power transmission efficiency will be described with reference to FIGS. 7 and 8. FIG. 7 is a view showing a simulation model of an electric power transmission system. FIG. 8 is a view showing the relation between deviation between the natural frequencies of the power transmission unit and the power reception unit and electric power transmission efficiency.

Referring to FIG. 7, an electric power transmission system 389 includes a power transmission unit 390 and a power reception unit 391. Power transmission unit 390 includes a first coil 392 and a second coil 393. Second coil 393 includes a resonance coil 394 and a capacitor 395 provided in resonance coil 394. Power reception unit 391 includes a third coil 396 and a fourth coil 397. Third coil 396 includes a resonance coil 399 and a capacitor 398 connected to resonance coil 399.

It is assumed that resonance coil 394 has an inductance Lt, capacitor 395 has a capacitance C1, resonance coil 399 has an inductance Lr, and capacitor 398 has a capacitance C2. When each parameter is set as described above, a natural frequency f1 of second coil 393 is expressed by the following equation (1), and a natural frequency f2 of third coil 396 is expressed by the following equation (2):

$$f1 = 1/\{2\pi(Lt \times C1)^{1/2}\} \quad (1)$$

$$f2 = 1/\{2\pi(Lr \times C2)^{1/2}\} \quad (2).$$

Here, FIG. 8 shows the relation between deviation between the natural frequencies of second coil 393 and third coil 396 and electric power transmission efficiency in a case where inductance Lr and capacitances C1, C2 are fixed and only inductance Lt is changed. It is noted that, in this simulation, the relative positional relation between resonance coil 394 and resonance coil 399 is fixed, and a current supplied to second coil 393 has a constant frequency.

In the graph shown in FIG. 8, the axis of abscissas represents deviation between the natural frequencies (%), and the axis of ordinates represents electric power transmission efficiency (%) at a constant frequency. The deviation between the natural frequencies (%) is expressed by the following equation (3):

$$\text{(Deviation between the natural frequencies)} = \{(f1 - f2)/f2\} \times 100(\%) \quad (3).$$

As can be seen from FIG. 8, when the deviation between the natural frequencies (%) is 0%, electric power transmission efficiency is close to 100%. When the deviation between the natural frequencies (%) is ±5%, electric power transmission efficiency is approximately 40%. When the deviation between the natural frequencies (%) is ±10%, electric power transmission efficiency is approximately 10%. When the deviation between the natural frequencies (%) is ±15%, electric power transmission efficiency is approximately 5%. That is, it can be seen that electric power transmission efficiency can be improved to a practical level by setting the natural frequencies of second coil 393 and third coil 396 such that the absolute value of the deviation between the natural frequencies (%) (i.e., the difference between the natural frequencies) is in the range of less than or equal to 10% of the natural frequency of third coil 396. Further, when the natural frequencies of second coil 393 and third coil 396 are set such that the absolute value of the deviation between the natural frequencies (%) is less than or equal to 5% of the natural frequency of third coil 396, electric power transmission efficiency can be further improved, which is more preferable. It is noted that an electromagnetic field analysis software (JMAG (registered trademark) manufactured by JSOL Corporation) is employed as simulation software.

Referring to FIG. 6 again, power reception unit 70 of vehicle 10 and power transmission unit 140 of power supply apparatus 100 supply and receive electric power in the non-contact manner through at least one of a magnetic field and an electric field formed between power reception unit 70 and power transmission unit 140. The magnetic field and the electric field oscillate at a specific frequency. A coupling coefficient κ between power reception unit 70 and power transmission unit 140 is about 0.1 to 0.3, and is preferably less than or equal to 0.1. Electric power is transmitted from power transmission unit 140 to power reception unit 70 by resonating power reception unit 70 and power transmission unit 140 by an electromagnetic field.

Here, a description will be given of a magnetic field having a specific frequency formed around power transmission unit 140. Typically, the "magnetic field having a specific frequency" is associated with electric power transmission efficiency and a frequency of a current supplied to power transmission unit 140. Thus, the relation between electric power transmission efficiency and the frequency of the current supplied to power transmission unit 140 will be described first. Electric power transmission efficiency obtained when electric power is transmitted from power transmission unit 140 to power reception unit 70 varies depending on various factors such as a distance between power transmission unit 140 and power reception unit 70. For example, it is assumed that power transmission unit 140 and power reception unit 70 have a natural frequency (resonance frequency) f0, the current supplied to power transmission unit 140 has a frequency f3, and power transmission unit 140 and power reception unit 70 have an air gap AG therebetween.

Figure 9:
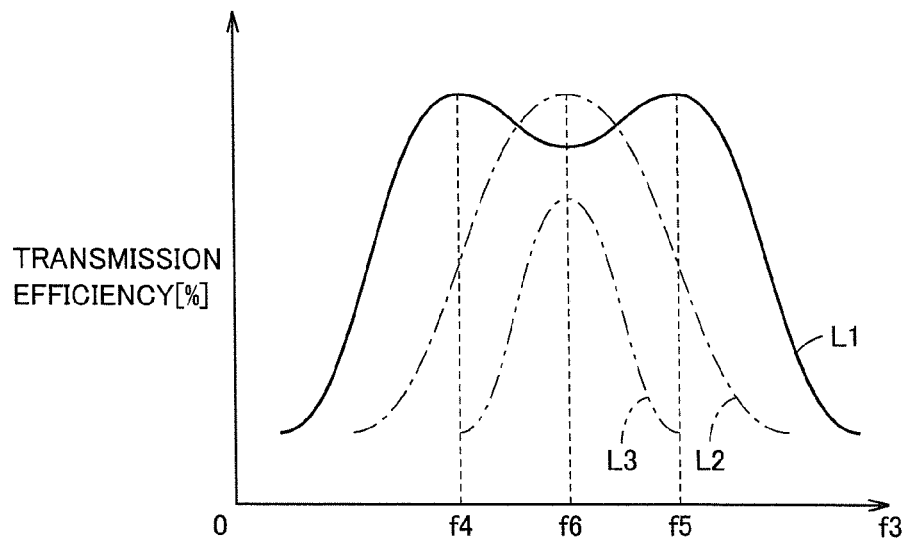
FIG. 9 is a graph showing the relation between electric power transmission efficiency obtained when an air gap is changed with the natural frequency being fixed and a frequency of a current supplied to the power transmission unit.

FIG. 9 is a graph showing the relation between electric power transmission efficiency obtained when air gap AG is changed with natural frequency f0 being fixed and frequency f3 of the current supplied to power transmission unit 140. Referring to FIG. 9, the axis of abscissas represents frequency f3 of the current supplied to power transmission unit 140, and the axis of ordinates represents electric power transmission efficiency (%). An efficiency curve L1 schematically indicates the relation between electric power transmission efficiency obtained when air gap AG is small and frequency f3 of the current supplied to power transmission unit 140. When air gap AG is small, as indicated by efficiency curve L1, electric power transmission efficiency has peaks at frequencies f4, f5 (f4<f5). As air gap AG is increased, the two peaks at which electric power transmission efficiency is high change to move closer to each other. Then, when air gap AG is increased to be more than a predetermined distance, as indicated by an efficiency curve L2, the peaks of electric power transmission efficiency become one peak, and electric power transmission efficiency reaches the peak when the current supplied to power transmission unit 140 has a frequency f6. When air gap AG is further increased from the state of efficiency curve L2, as indicated by an efficiency curve L3, electric power transmission efficiency has a lower peak.

Examples of a technique for improving electric power transmission efficiency may include the following techniques. A first technique is a technique for changing characteristics of electric power transmission efficiency between power transmission unit 140 and power reception unit 70, by changing capacitances of capacitors 335, 350 in accordance with air gap AG, with the frequency of the current supplied to power transmission unit 140 being constant. Specifically, with the frequency of the current supplied to power transmission unit 140 being constant, the capacitances of capacitors 335, 350 are adjusted such that electric power transmission efficiency reaches a peak. In this technique, the frequency of the current flowing to power transmission unit 140 and power reception unit 70 is constant, irrespective of the size of air gap AG. It is noted that, as the technique for changing characteristics of electric power transmission efficiency, a technique utilizing matching box 135 of power supply apparatus 100, a technique utilizing a converter provided between rectifier 75 and power storage device 12 in vehicle 10, or the like can also be adopted.

A second technique is a technique for adjusting the frequency of the current supplied to power transmission unit 140 based on the size of air gap AG. For example, when electric power transmission characteristics are as indicated by efficiency curve L1, a current having frequency f4 or f5 is supplied to power transmission unit 140. When frequency characteristics are as indicated by efficiency curves L2, L3, a current having frequency f6 is supplied to power transmission unit 140. In this case, the frequency of the current flowing to power transmission unit 140 and power reception unit 70 is changed in accordance with the size of air gap AG.

In the first technique, the frequency of the current flowing through power transmission unit 140 is a fixed, constant frequency, and in the second technique, the frequency of the current flowing through power transmission unit 140 is a frequency changed as appropriate in accordance with air gap AG. The current having a specific frequency set by the first technique, the second technique, or the like to have a high electric power transmission efficiency is supplied to power transmission unit 140. When the current having a specific frequency flows through power transmission unit 140, a magnetic field (electromagnetic field) oscillating at the specific frequency is formed around power transmission unit 140. Power reception unit 70 receives electric power from power transmission unit 140 through the magnetic field formed between power reception unit 70 and power transmission unit 140 and oscillating at the specific frequency. Accordingly, the "magnetic field oscillating at a specific frequency" is not necessarily limited to a magnetic field having a fixed frequency. It is noted that, although the frequency of the current supplied to power transmission unit 140 is set focusing on air gap AG in the above example, electric power transmission efficiency may also be changed by other factors such as horizontal deviation between power transmission unit 140 and power reception unit 70, and the frequency of the current supplied to power transmission unit 140 may be adjusted based on such other factors.

Although the above description describes the case where a helical coil is adopted as a resonance coil, in a case where an antenna such as a meander line is adopted as a resonance coil, a current having a specific frequency flows through power transmission unit 140, and thereby an electric field having the specific frequency is formed around power transmission unit 140. Through the electric field, electric power transmission is performed between power transmission unit 140 and power reception unit 70.

In this electric power transmission system, power transmission and reception efficiency is improved by utilizing a near field (evanescent field) in which a "static electromagnetic field" of the electromagnetic field is dominant.

Figure 10:
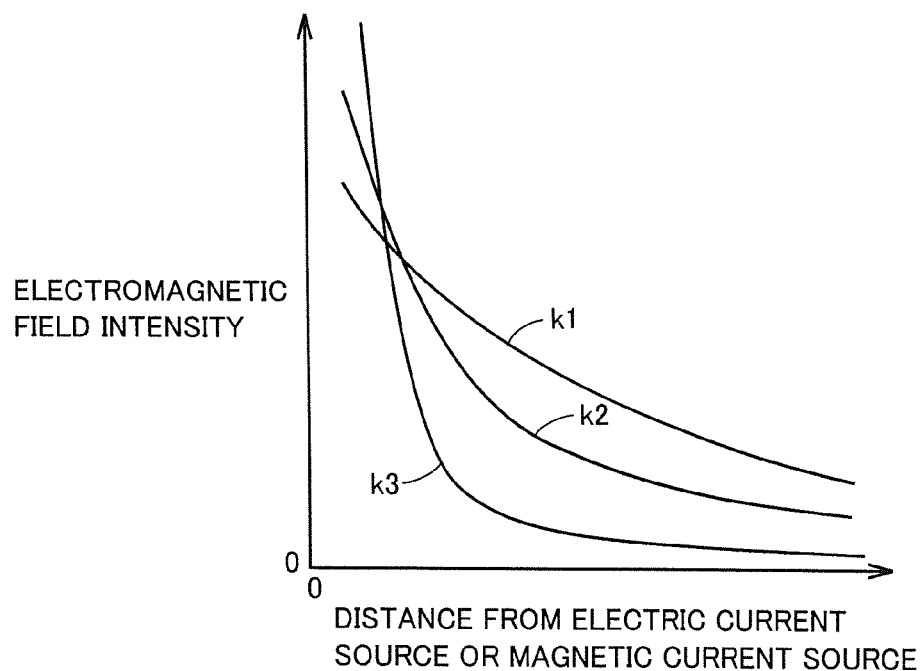
FIG. 10 is a view showing the relation between the distance from an electric current source or a magnetic current source and the intensity of an electromagnetic field.

FIG. 10 is a view showing the relation between the distance from an electric current source or a magnetic current source and the intensity of an electromagnetic field. Referring to FIG. 10, the electromagnetic field includes three components. A curve k1 is a component in inverse proportion to the distance from a wave source, and is referred to as a "radiation electromagnetic field". A curve k2 is a component in inverse proportion to the square of the distance from the wave source, and is referred to as an "inductive electromagnetic field". A curve k3 is a component in inverse proportion to the cube of the distance from the wave source, and is referred to as a "static electromagnetic field". It is noted that, when it is assumed that the electromagnetic field has a wavelength "λ", the distance at which the intensities of the "radiation electromagnetic field", the "inductive electromagnetic field", and the "static electromagnetic field" are substantially equal can be indicated as $\lambda/2\pi$.

The "static electromagnetic field" is a region in which the intensity of an electromagnetic wave sharply decreases with distance from the wave source. In the electric power transmission system in accordance with Embodiment 1, energy (electric power) is transmitted utilizing the near field (evanescent field) in which the "static electromagnetic field" is dominant. Specifically, by resonating power transmission unit 140 and power reception unit 70 (for example, a pair of resonance coils) having natural frequencies close to each other in the near field in which the "static electromagnetic field" is dominant, energy (electric power) is transmitted from power transmission unit 140 to power reception unit 70 on the other side. Since the "static electromagnetic field" does not propagate energy over a long distance, the resonance method can transmit electric power with less energy loss, when compared with an electromagnetic wave which transmits energy (electric power) using the "radiation electromagnetic field" which propagates energy over a long distance.

Thus, in this electric power transmission system, electric power is transmitted between power transmission unit 140 and power reception unit 70 in the non-contact manner by resonating power transmission unit 140 and power reception unit 70 by the electromagnetic field. Coupling coefficient κ between power transmission unit 140 and power reception unit 70 is about 0.1 to 0.3, and is preferably less than or equal to 0.1. However, coupling coefficient κ is not limited to such a value, and may have various values which improve electric power transmission. Generally, in electric power transmission utilizing electromagnetic induction, coupling coefficient κ between a power transmission unit and a power reception unit has a value close to 1.0.

It is noted that coupling between power transmission unit 140 and power reception unit 70 as described above in electric power transmission is referred to as, for example, "magnetic resonance coupling", "magnetic field resonance coupling", "electromagnetic field resonance coupling", "electric field resonance coupling", and the like. "Electromagnetic field resonance coupling" means coupling including all of "magnetic resonance coupling", "magnetic field resonance coupling", and "electric field resonance coupling".

In a case where power transmission unit 140 and power reception unit 70 are formed of coils as described above, power transmission unit 140 and power reception unit 70 are coupled mainly by a magnetic field, and "magnetic resonance coupling" or "magnetic field resonance coupling" is formed. It is noted that, for example, an antenna such as a meander line can be adopted in power transmission unit 140 and power reception unit 70. In this case, power transmission unit 140 and power reception unit 70 are coupled mainly by an electric field, and "electric field resonance coupling" is formed.

As described above, in Embodiment 1, charging power Pc by the contact charging and charging power Pw by the non-contact charging are controlled based on the sum of charging power Pc and charging power Pw. More specifically, when the summed value of maximum power Pc_max indicative of the upper limit of charging power Pc by the contact charging and maximum power Pw_max indicative of the upper limit of charging power Pw by the non-contact charging is less than or equal to a predetermined limitation (i.e., allowable input power Win for power storage device 12, electric power receivable from the outside power source, or the like), charging power Pc and charging power Pw are controlled to become equal to maximum power Pc_max and maximum power Pw_max, respectively. When the summed value of maximum power Pc_max and maximum power Pw_max exceeds the predetermined limitation, charging power Pc and charging power Pw are controlled such that the sum of charging power Pc and charging power Pw does not exceed the predetermined limitation by limiting one of power reception by the contact charging and power reception by the non-contact charging which is less efficient (i.e., has worse power cost). Therefore, according to Embodiment 1, power storage device 12 can be charged by using the contact charging and the non-contact charging each properly depending on the situation under conditions appropriate to user advantages, while suppressing excessive input to power storage device 12, excessive power reception from the outside power source, and the like.

[Variation 1 of Embodiment 1]

Although the above description describes the case where, when the summed value of maximum power Pc_max indicative of the upper limit of charging power Pc by the contact charging and maximum power Pw_max indicative of the upper limit of charging power Pw by the non-contact charging exceeds a predetermined limitation, one of power reception by the contact charging and power reception by the non-contact charging which has worse power cost is limited, electric power transmission efficiency may be used as an indicator, instead of power cost. Specifically, in Variation 1, when the sum of maximum power Pc_max and maximum power Pw_max exceeds a predetermined limitation, one of power reception by the contact charging and power reception by the non-contact charging which has worse electric power transmission efficiency is limited. It is noted that limiting the one which has worse electric power transmission efficiency includes both of reducing (limiting) the charging power which has worse electric power transmission efficiency, and stopping the charging which has worse electric power transmission efficiency.

Figure 11:
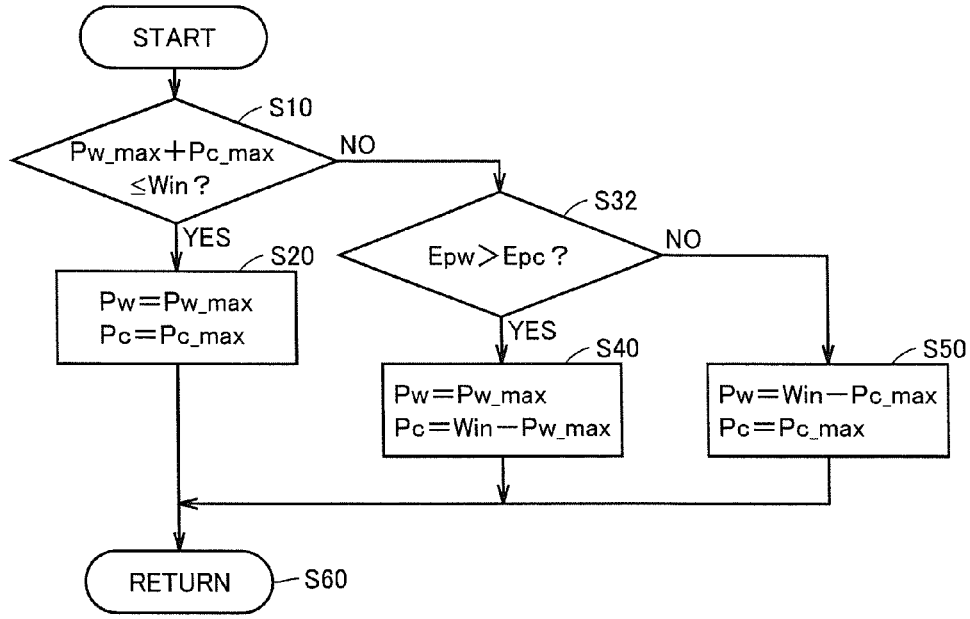
FIG. 11 is a flowchart for illustrating a processing procedure of power control in Variation 1.

FIG. 11 is a flowchart for illustrating a processing procedure of power control in Variation 1. The processing in this flowchart is also called from the main routine and executed repeatedly at regular time intervals or whenever a predetermined condition is satisfied. Referring to FIG. 11, this flowchart includes step S32 instead of step S30 in the flowchart shown in FIG. 4.

Specifically, when ECU 90 determines in step S10 that the sum of maximum power Pw_max and maximum power Pc_max is more than allowable input power Win (NO in step S10), ECU 90 determines whether or not electric power transmission efficiency Epw of the non-contact charging is higher than electric power transmission efficiency Epc of the contact charging (step S32). These electric power transmission efficiencies have a wide concept including power reception efficiency based on electric power received by charging inlet 40 and power reception unit 70, charging efficiency based on electric power actually charged in power storage device 12, power transmission efficiency based on reflected electric power on the power supply apparatus 100 side, and the like.

When ECU 90 determines in step S32 that electric power transmission efficiency Epw of the non-contact charging is higher than electric power transmission efficiency Epc of the contact charging (YES in step S32), the processing proceeds to step S40, and charging power Pc by the contact charging having a relatively low electric power transmission efficiency is limited. On the other hand, when ECU 90 determines in step S32 that electric power transmission efficiency Epw of the non-contact charging is less than or equal to electric power transmission efficiency Epc of the contact charging (NO in step S32), the processing proceeds to step S50, and charging power Pw by the non-contact charging having a relatively low electric power transmission efficiency is limited.

Also according to Variation 1 of Embodiment 1, the same effect as that in Embodiment 1 is obtained.

[Variation 2 of Embodiment 1]

Although Variation 1 describes the case where, when the sum of maximum power Pc_max and maximum power Pw_max exceeds a predetermined limitation, one of power reception by the contact charging and power reception by the non-contact charging which has worse electric power transmission efficiency is limited, the amount of CO2 generated at the time of power generation may be used as an indicator, instead of electric power transmission efficiency.

Figure 12:
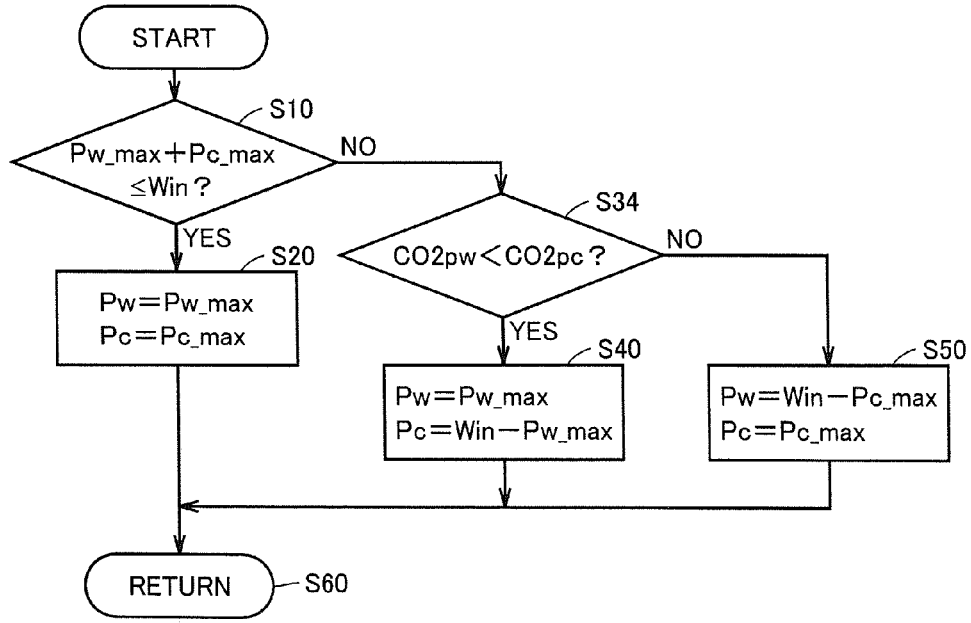
FIG. 12 is a flowchart for illustrating a processing procedure of power control in Variation 2.

FIG. 12 is a flowchart for illustrating a processing procedure of power control in Variation 2. The processing in this flowchart is also called from the main routine and executed repeatedly at regular time intervals or whenever a predetermined condition is satisfied. Referring to FIG. 12, this flowchart includes step S34 instead of step S30 in the flowchart shown in FIG. 4.

Specifically, when ECU 90 determines in step S10 that the sum of maximum power Pw_max and maximum power Pc_max is more than allowable input power Win (NO in step S10), ECU 90 determines whether or not the amount of carbon dioxide CO2pw of the non-contact charging is less than the amount of carbon dioxide CO2 pc of the contact charging (step S34). As an example, the amount of carbon dioxide CO2pw is calculated by multiplying the amount of CO2 emission per unit power of outside power source 130 (FIG. 1) by the electric power transmission efficiency of the non-contact charging, and the amount of carbon dioxide CO2 pc is calculated by multiplying the amount of CO2 emission per unit power of outside power source 110 (FIG. 1) by the electric power transmission efficiency of the contact charging. It is noted that information about the amounts of carbon dioxide CO2pw, CO2 pc is obtained from power supply apparatus 100, using first communication device 60 and second communication device 95.

When ECU 90 determines in step S34 that the amount of carbon dioxide CO2pw of the non-contact charging is less than the amount of carbon dioxide CO2 pc of the contact charging (YES in step S34), the processing proceeds to step S40, and charging power Pc by the contact charging having a relatively large amount of carbon dioxide is limited. On the other hand, when ECU 90 determines in step S34 that the amount of carbon dioxide CO2pw of the non-contact charging is more than or equal to the amount of carbon dioxide CO2 pc of the contact charging (NO in step S34), the processing proceeds to step S50, and charging power Pw by the non-contact charging having a relatively large amount of carbon dioxide is limited.

Also according to Variation 2 of Embodiment 1, the same effect as that in Embodiment 1 is obtained.

Embodiment 2

In the contact charging using charging inlet 40 and charger 45, charging is started by guiding and stopping vehicle 10 at a position where electric power can be supplied from power supply apparatus 100 to vehicle 10 through the charging cable, and thereafter connecting the charging cable to charging inlet 40. On the other hand, in the non-contact charging, charging can be started merely by guiding vehicle 10 to a position where electric power can be transmitted from power transmission unit 140 of power supply apparatus 100 to power reception unit 70 of vehicle 10, without connecting a cable as in the case of the contact charging.

Accordingly, in Embodiment 2, in a case where electric power transmission using both of the contact charging and the non-contact charging is requested, the non-contact charging is started prior to the contact charging. Specifically, when vehicle 10 is guided to a position where electric power can be transmitted from power transmission unit 140 of power supply apparatus 100 to power reception unit 70 of vehicle 10 (hereinafter, such guidance control will also be referred to as "alignment control" between power reception unit 70 and power transmission unit 140), the non-contact charging is started. When the charging cable is connected to charging inlet 40 thereafter, the contact charging is started.

The overall configuration diagram of a vehicle charging system in accordance with Embodiment 2 is identical to that of Embodiment 1 shown in FIG. 1.

Figure 13:
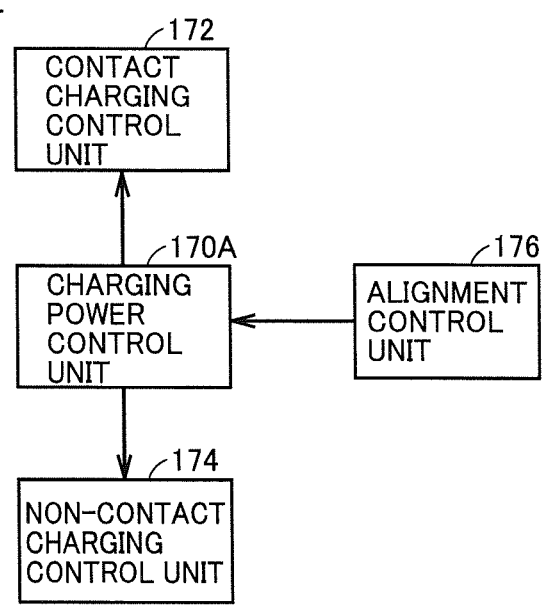
FIG. 13 is a functional block diagram of a portion related to charging control, of an ECU in Embodiment 2.

FIG. 13 is a functional block diagram of a portion related to charging control, of an ECU 90A in Embodiment 2. Referring to FIG. 13, ECU 90A further includes an alignment control unit 176, and includes a charging power control unit 170A instead of charging power control unit 170, in the configuration of ECU 90 in Embodiment 1 shown in FIG. 2.

Figure 14:
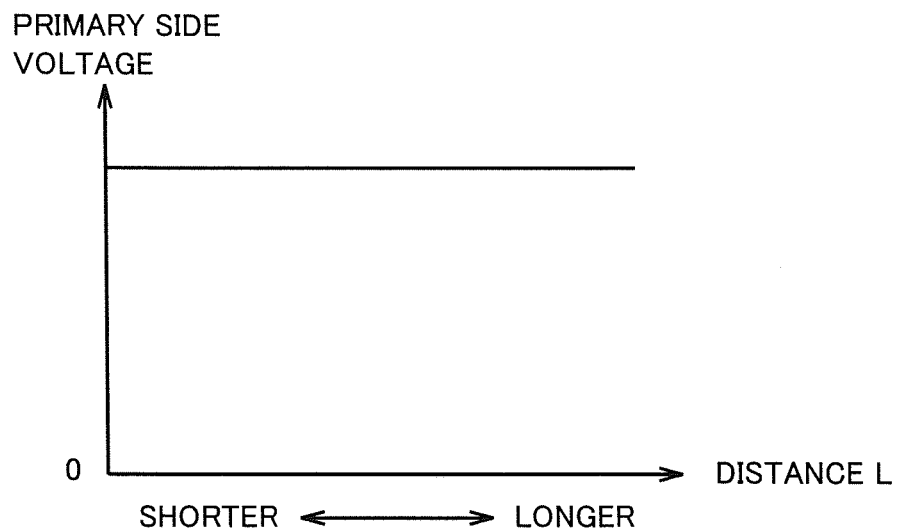
FIG. 14 is a view showing the relation between the distance between the power transmission unit and the power reception unit and a primary side voltage.
Figure 15:
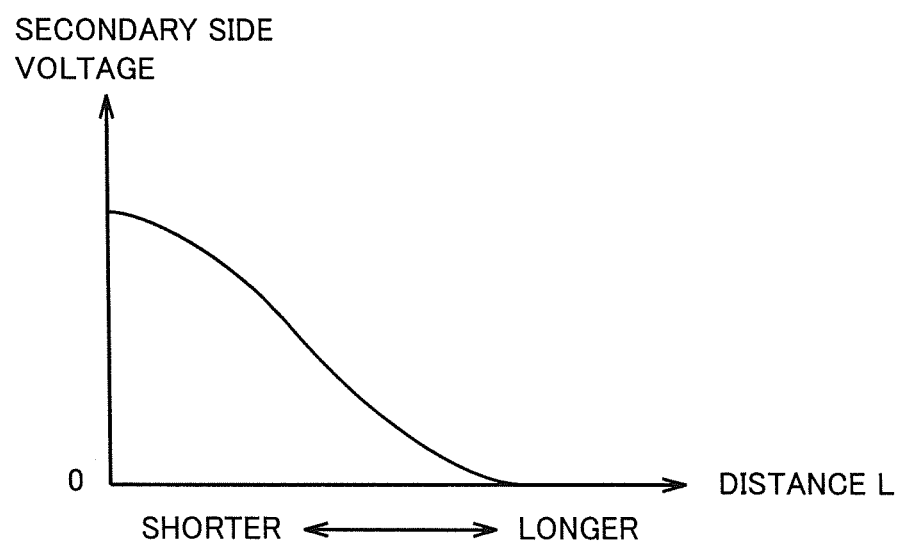
FIG. 15 is a view showing the relation between the distance between the power transmission unit and the power reception unit and a secondary side voltage.

Alignment control unit 176 controls alignment between power transmission unit 140 of power supply apparatus 100 and power reception unit 70 of vehicle 10 for performing electric power transmission from power transmission unit 140 to power reception unit 70 with appropriate efficiency. Specifically, relative to a constant primary side voltage (output voltage from power supply apparatus 100) as shown in FIG. 14, a secondary side voltage (voltage received by vehicle 10) varies in accordance with a distance L between power transmission unit 140 and power reception unit 70 as shown in FIG. 15. Accordingly, by preparing a map or the like for example by measuring the relations of the primary side voltage and the secondary side voltage shown in FIGS. 14 and 15 in advance, the distance between power transmission unit 140 and power reception unit 70 can be sensed based on a detected value of the secondary side voltage (voltage received by vehicle 10).

Although not particularly shown, power received by vehicle 10, power reception efficiency, or the like may be used instead of the voltage received by vehicle 10. Alternatively, since a primary side current (output current from power supply apparatus 100) varies in accordance with distance L between power transmission unit 140 and power reception unit 70, this relation may be used to sense the distance between power transmission unit 140 and power reception unit 70 based on a detected value of the output current from power supply apparatus 100.

Referring to FIG. 13 again, when the alignment between power transmission unit 140 and power reception unit 70 for allowing electric power to be transmitted from power transmission unit 140 to power reception unit 70 with appropriate efficiency is completed based on the distance between power transmission unit 140 and power reception unit 70, and preparation for the non-contact charging is completed, alignment control unit 176 notifies charging power control unit 170A of that matter. Completion of the preparation for the non-contact charging may be determined based on actuation of a parking brake, shift to a ready-off state indicating suspension of a vehicle system, an operation of turning on a non-contact charging start switch provided exclusively, or the like, instead of completion of the alignment described above.

When charging power control unit 170A receives the above notice from alignment control unit 176, charging power control unit 170A instructs non-contact charging control unit 174 to start the non-contact charging. When the charging cable is connected to charging inlet 40 and preparation for the contact charging is completed thereafter, charging power control unit 170A instructs contact charging control unit 172 to start the contact charging. Completion of the preparation for the contact charging may be determined based on an operation of turning on a contact charging start switch provided exclusively, or the like, instead of connection of the charging cable. It is noted that charging power control unit 170A controls charging power Pw by the non-contact charging and charging power Pc by the contact charging, as with charging power control unit 170 in Embodiment 1.

Figure 16:
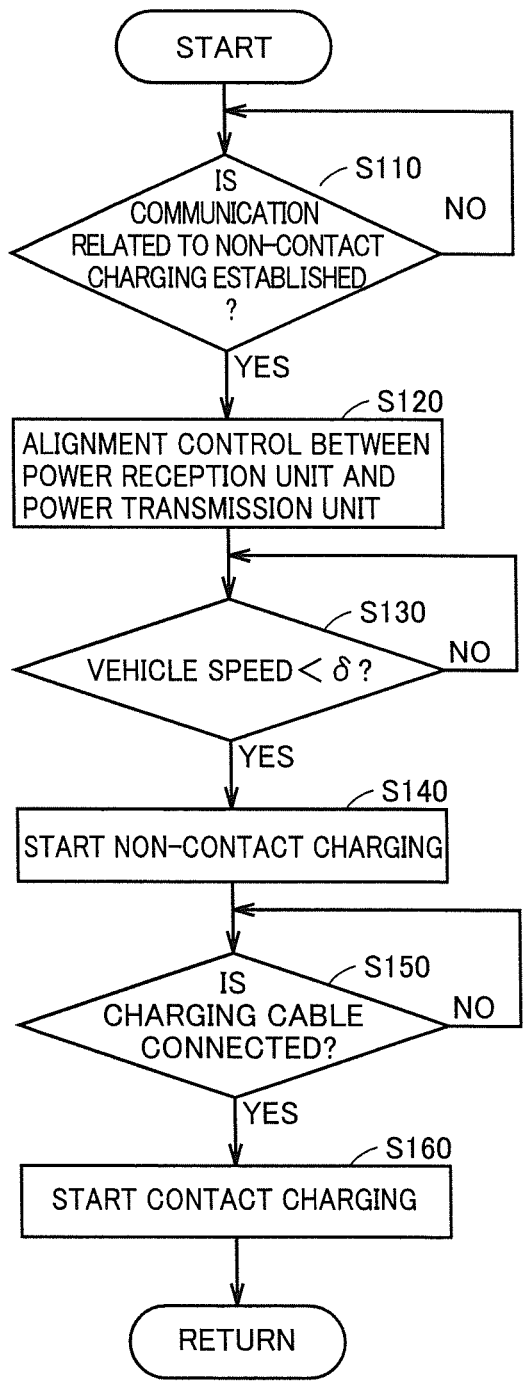
FIG. 16 is a flowchart illustrating a processing procedure of control at the time of starting charging performed by the ECU in Embodiment 2.

FIG. 16 is a flowchart illustrating a processing procedure of control at the time of starting charging performed by ECU 90A in Embodiment 2. The processing in this flowchart is also called from the main routine and executed repeatedly at regular time intervals or whenever a predetermined condition is satisfied.

Referring to FIG. 16, ECU 90A determines whether or not communication related to the non-contact charging is established (step S110). Since the communication related to the non-contact charging is performed wirelessly between second communication device 95 of vehicle 10 and fourth communication device 150 of power supply apparatus 100, ECU 90A determines here whether or not communication between second communication device 95 and fourth communication device 150 is established. When the communication related to the non-contact charging is established (YES in step S110), ECU 90A performs the alignment control between power reception unit 70 of vehicle 10 and power transmission unit 140 of power supply apparatus 100 (step S120).

Next, ECU 90A determines whether or not the vehicle speed of vehicle 10 is lower than a value δ (step S130). Value δ is a threshold value for determining that vehicle 10 is stopped. When ECU 90A determines that the vehicle speed is lower than value δ (YES in step S130), ECU 90A starts the non-contact charging (step S140).

Subsequently, ECU 90A determines whether or not the charging cable for the contact charging is connected to charging inlet 40 (step S150). When ECU 90A determines that the charging cable is connected (YES in step S150) and thereafter preparation for the contact charging is completed, ECU 90A starts the contact charging using charger 45 (step S160).

As described above, in Embodiment 2, in the case where electric power transmission using both of the contact charging and the non-contact charging is requested, when the alignment between power transmission unit 140 and power reception unit 70 is completed, the non-contact charging is started first without waiting for the preparation for the contact charging (such as connection of the charging cable). Therefore, according to Embodiment 2, charging of power storage device 12 by the outside power source can be finished faster.

Embodiment 3

Power storage device 12 is charged to a predetermined fully charged state (for example, an SOC of 80%) by the contact charging using charger 45 and the non-contact charging using power reception unit 70. In Embodiment 3, full charging control for charging power storage device 12 to a fully charged state by the outside power source is performed in two stages.

Figure 17:
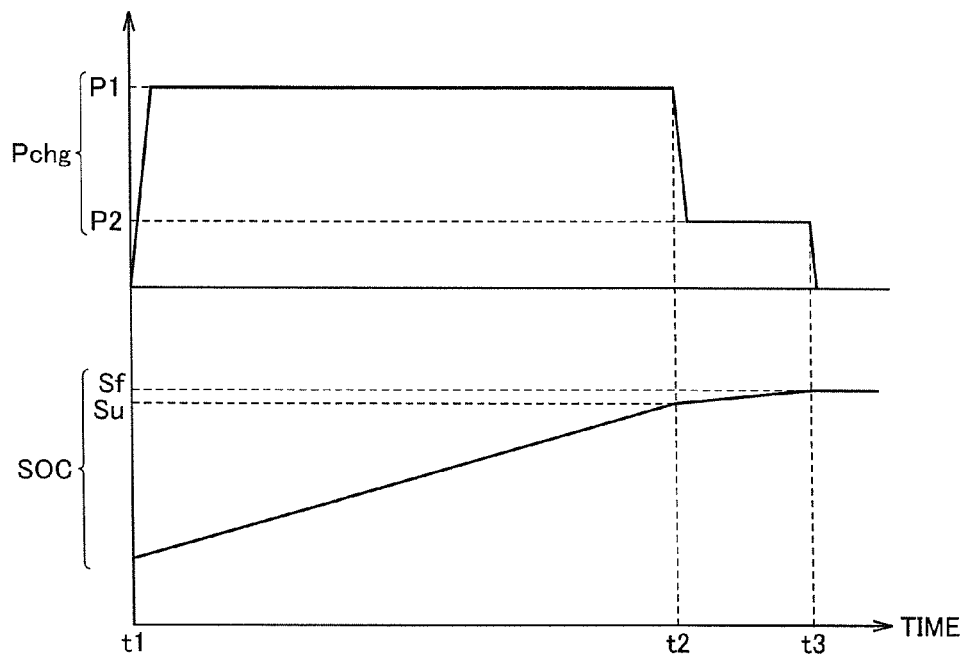
FIG. 17 is a view showing an example of changes in charging power and the SOC of the power storage device at the time of full charging control.

FIG. 17 is a view showing an example of changes in charging power Pchg and the SOC of power storage device 12 at the time of the full charging control. Referring to FIG. 17, when charging by the outside power source is started, power storage device 12 is charged with a maximum value P1 of charging power Pchg (for example, allowable input power Win). When the SOC reaches a predetermined value Su, which is a value immediately prior to a fully charged state Sf, at a time t2, charging power Pchg is limited to P2. Then, when the SOC reaches fully charged state Sf at a time t3, charging is finished.

Figure 18:
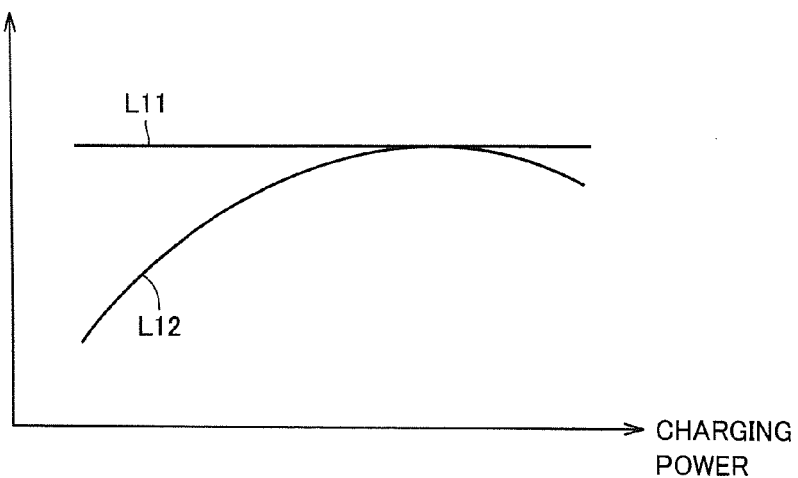
FIG. 18 is a view showing electric power transmission efficiencies in the contact charging and the non-contact charging.

FIG. 18 is a view showing electric power transmission efficiencies in the contact charging and the non-contact charging. Referring to FIG. 18, the axis of abscissas represents charging power, and the axis of ordinates represents electric power transmission efficiency. A line L11 indicates an efficiency curve of the contact charging, and a line L12 indicates an efficiency curve of the non-contact charging. As shown, in the contact charging, efficiency is not so changed depending on the magnitude of the charging power, whereas in the non-contact charging, as the charging power is decreased, impedance is changed equivalently and electric power transmission efficiency is reduced.

Accordingly, in Embodiment 3, when the charging power is limited immediately prior to full charging (time t2 and afterward in FIG. 17), power storage device 12 is charged by using the contact charging and limiting the non-contact charging. This can suppress a reduction in electric power transmission efficiency when the charging power is limited immediately prior to the full charging.

The overall configuration diagram of a vehicle charging system in accordance with Embodiment 3 is identical to that of Embodiment 1 shown in FIG. 1.

Figure 19:
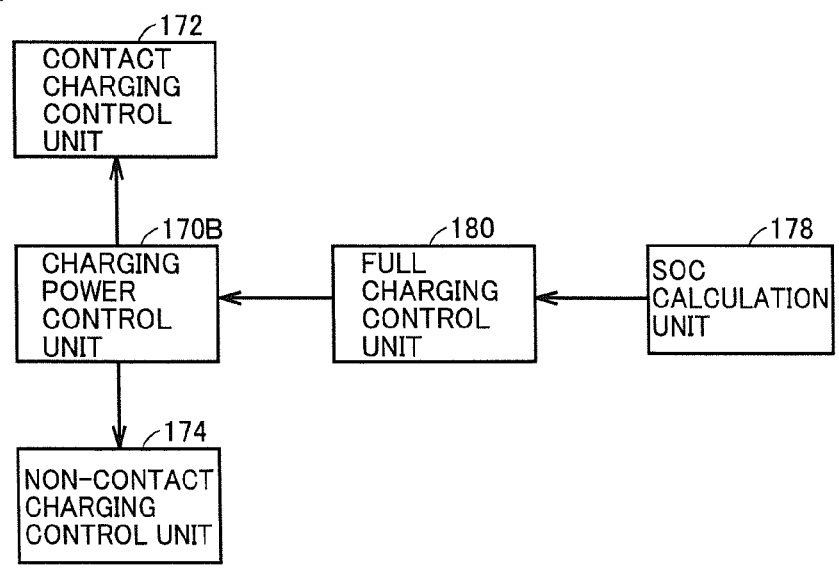
FIG. 19 is a functional block diagram of a portion related to charging control, of an ECU in Embodiment 3.

FIG. 19 is a functional block diagram of a portion related to charging control, of an ECU 90B in Embodiment 3. Referring to FIG. 19, ECU 90B further includes an SOC calculation unit 178 and a full charging control unit 180, and includes a charging power control unit 170B instead of charging power control unit 170, in the configuration of ECU 90 in Embodiment 1 shown in FIG. 2.

SOC calculation unit 178 calculates the SOC of power storage device 12 based on a voltage and a current of power storage device 12 detected by sensors not shown. As a method for calculating the SOC, various known techniques can be used.

Full charging control unit 180 receives a calculated value of the SOC from SOC calculation unit 178. Then, when the SOC reaches predetermined value Su immediately prior to the full charging, full charging control unit 180 notifies charging power control unit 170B of that matter. In addition, when the SOC reaches fully charged state Sf, full charging control unit 180 notifies charging power control unit 170B of that matter.

Until the SOC reaches predetermined value Su, charging power control unit 170B controls charging power Pc by the contact charging and charging power Pw by the non-contact charging such that the sum of charging power Pc and charging power Pw does not exceed allowable input power Win for power storage device 12, as with charging power control unit 170 described in Embodiment 1.

When the SOC reaches predetermined value Su, charging power control unit 170B instructs non-contact charging control unit 174 to stop the non-contact charging. It is noted that the non-contact charging need not be stopped, and the ratio of the contact charging may be relatively increased by reducing charging power Pw by the non-contact charging.

Figure 20:
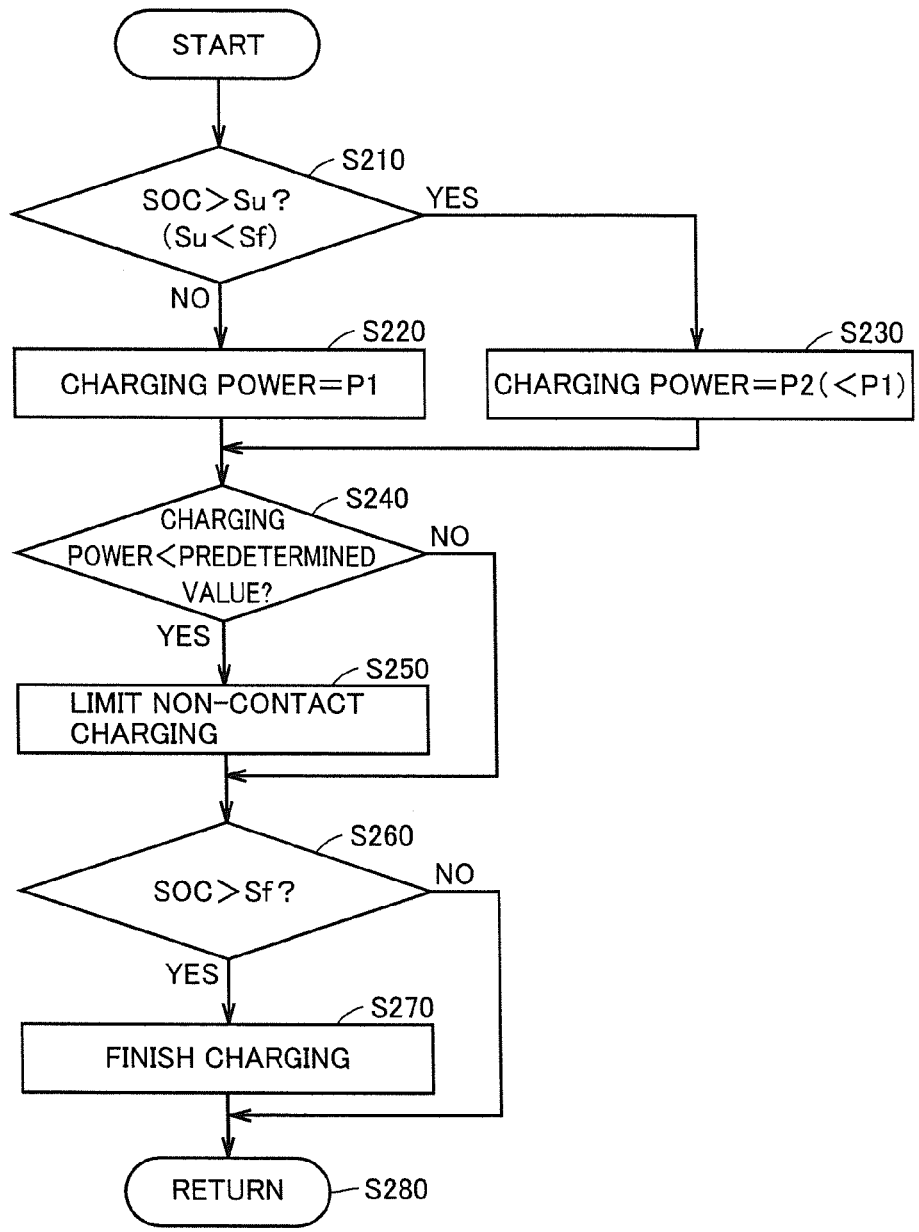
FIG. 20 is a flowchart illustrating a processing procedure of power control at the time of finishing charging performed by the ECU in Embodiment 3.

FIG. 20 is a flowchart illustrating a processing procedure of power control at the time of finishing charging performed by ECU 90B in Embodiment 3. The processing in this flowchart is also called from the main routine and executed repeatedly at regular time intervals or whenever a predetermined condition is satisfied.

Referring to FIG. 20, ECU 90B determines whether or not the SOC of power storage device 12 exceeds predetermined value Su immediately prior to the full charging (step S210). When ECU 90B determines that the SOC does not reach predetermined value Su (NO in step S210), ECU 90B sets charging power Pchg for power storage device 12 to P1 (FIG. 17) (step S220). As described above, P1 is, for example, allowable input power Win. When the SOC reaches predetermined value Su (YES in step S210), ECU 90B limits charging power Pchg for power storage device 12 to P2 (FIG. 17) (step S230).

Subsequently, ECU 90B determines whether or not charging power Pchg is lower than a predetermined value (step S240). The predetermined value is a threshold value for limiting the non-contact charging to suppress a reduction in electric power transmission efficiency due to a reduced efficiency of the non-contact charging, and is set based on the efficiency curve shown in FIG. 18 and the like.

When ECU 90B determines that charging power Pchg is lower than the predetermined value (YES in step S240), ECU 90B limits the non-contact charging (step S250). As described above, ECU 90B may stop the non-contact charging, or may reduce charging power Pw by the non-contact charging without stopping the non-contact charging. When ECU 90B determines in step S240 that charging power Pchg is more than or equal to the predetermined value (NO in step S240), ECU 90B advances the processing to step S260 without performing step S250.

Subsequently, ECU 90B determines whether or not the SOC of power storage device 12 exceeds fully charged state Sf (step S260). When ECU 90B determines that the SOC exceeds fully charged state Sf (YES in step S260), ECU 90B finishes charging power storage device 12 (step S270). When ECU 90B determines in step S260 that the SOC is less than or equal to fully charged state Sf (NO in step S260), ECU 90B advances the processing to step S280 without performing step S270.

Although the above description describes the case where, when the SOC reaches predetermined value Su immediately prior to fully charged state Sf, the power storage device is charged with charging power Pchg being limited to constant value P2 (such charging will also be referred to as constant power charging (CP charging)), constant voltage charging (CV charging) controlling the voltage of power storage device 12 at a constant value may be performed when the SOC reaches predetermined value Su. Also in the CV charging, charging power Pchg is reduced as the SOC comes close to fully charged state Sf, and when charging power Pchg becomes lower than a predetermined value, the non-contact charging is limited and a reduction in electric power transmission efficiency is suppressed.

As described above, in Embodiment 3, when the SOC reaches predetermined value Su immediately prior to the full charging, power storage device 12 is charged by using the contact charging and limiting the non-contact charging. This can suppress a reduction in electric power transmission efficiency when the charging power is limited immediately prior to the full charging. Therefore, according to Embodiment 3, power storage device 12 can be charged more efficiently.

Embodiment 4

In Embodiment 4, pre-air-conditioning which conditions air in a vehicle interior in advance before a user gets in the vehicle can be performed. The pre-air-conditioning is performed using an electrically powered air conditioner. Therefore, charging power in vehicle 10 is reduced when the pre-air-conditioning is performed. When vehicle 10 is in a state where it can be charged from power supply apparatus 100 during the pre-air-conditioning (for example, in a case where charging of power storage device 12 by the outside power source is finished, and thereafter, with the charging cable being connected, the pre-air-conditioning is requested before vehicle 10 is used), a reduction in charging power caused by the pre-air-conditioning can be supplemented from power supply apparatus 100.

Here, in the contact charging using charger 45, a relatively large heat is generated when compared with the non-contact charging using power reception unit 70, due to heat generation caused for example by an operation of switching a power semiconductor element constituting charger 45. Accordingly, in Embodiment 4, when the pre-air-conditioning is set for heating, a reduction in charging power caused by performing the pre-air-conditioning is supplemented by the contact charging which generates a relatively large heat. On the other hand, when the pre-air-conditioning is set for cooling, a reduction in charging power caused by performing the pre-air-conditioning is supplemented by the non-contact charging which generates a relatively small heat.

The overall configuration diagram of a vehicle charging system in accordance with Embodiment 4 is identical to that of Embodiment 1 shown in FIG. 1.

Figure 21:
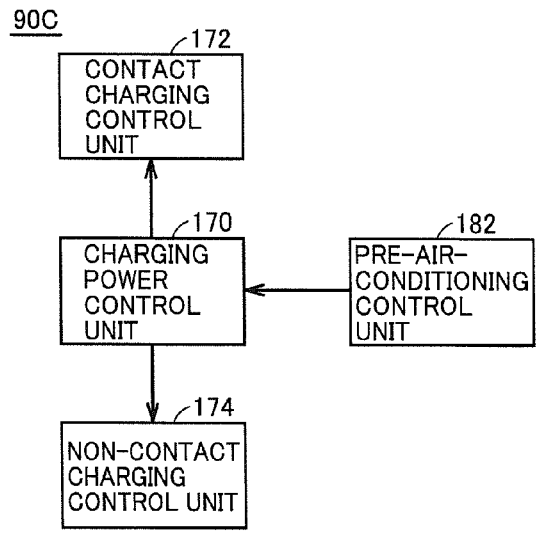
FIG. 21 is a functional block diagram of a portion related to charging control, of an ECU in Embodiment 4.

FIG. 21 is a functional block diagram of a portion related to charging control, of an ECU 90C in Embodiment 4. Referring to FIG. 21, ECU 90C further includes a pre-air-conditioning control unit 182, and includes a charging power control unit 170C instead of charging power control unit 170, in the configuration of ECU 90 in Embodiment 1 shown in FIG. 2.

When there is a request to perform the pre-air-conditioning, pre-air-conditioning control unit 182 performs the pre-air-conditioning for heating or cooling. The setting for heating or cooling may be set by the user, or may be set in accordance with a difference between an outside air temperature and a preset temperature. Then, pre-air-conditioning control unit 182 notifies charging power control unit 170C that the pre-air-conditioning will be performed, as well as notifies charging power control unit 170C of the setting of heating/cooling.

When the pre-air-conditioning for heating is performed, charging power control unit 170C outputs a power command for supplementing a reduction in charging power caused by the pre-air-conditioning, to contact charging control unit 172. In a case where charging of power storage device 12 by the outside power source is once finished, a power command corresponding to electric power used for the pre-air-conditioning is output to contact charging control unit 172. In a case where power storage device 12 is being charged by the outside power source, a power command prepared by adding the power command for the pre-air-conditioning to a power command for the contact charging is output to contact charging control unit 172.

On the other hand, when the pre-air-conditioning for cooling is performed, charging power control unit 170C outputs a power command for supplementing a reduction in charging power caused by the pre-air-conditioning, to non-contact charging control unit 174. In a case where charging of power storage device 12 by the outside power source is once finished, a power command corresponding to electric power used for the pre-air-conditioning is output to non-contact charging control unit 174. In a case where power storage device 12 is being charged by the outside power source, a power command prepared by adding the power command for the pre-air-conditioning to a power command for the non-contact charging is output to non-contact charging control unit 174.

Figure 22:
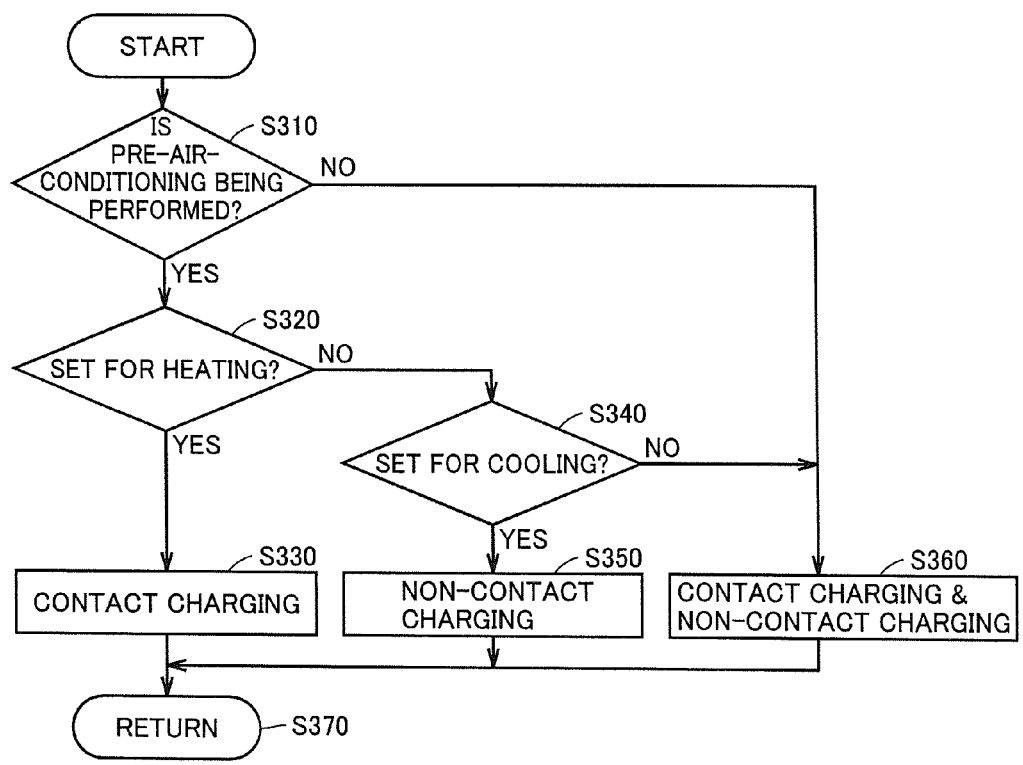
FIG. 22 is a flowchart illustrating power control at the time of pre-air-conditioning performed by the ECU in Embodiment 4.

FIG. 22 is a flowchart illustrating power control at the time of the pre-air-conditioning performed by ECU 90C in Embodiment 4. The processing in this flowchart is also called from the main routine and executed repeatedly at regular time intervals or whenever a predetermined condition is satisfied.

Referring to FIG. 22, ECU 90C determines whether or not the pre-air-conditioning is being performed (step S310). When ECU 90C determines that the pre-air-conditioning is being performed (YES in step S310), ECU 90C determines whether or not the pre-air-conditioning is set for heating (step S320). This setting may be set by the user, or may be set in accordance with the difference between the outside air temperature and the preset temperature. Then, when ECU 90C determines in step S320 that the pre-air-conditioning is set for heating (YES in step S320), ECU 90C performs the contact charging which generates a relatively large heat to supplement a reduction in charging power caused by the pre-air-conditioning (step S330).

On the other hand, when ECU 90C determines in step S320 that the pre-air-conditioning is not set for heating (NO in step S320), ECU 90C determines whether or not the pre-air-conditioning is set for cooling (step S340). This setting may also be set by the user, or may be set in accordance with the difference between the outside air temperature and the preset temperature. Then, when ECU 90C determines in step S340 that the pre-air-conditioning is set for cooling (YES in step S340), ECU 90C performs the non-contact charging which generates a relatively small heat to supplement a reduction in charging power caused by the pre-air-conditioning (step S350).

When ECU 90C determines in step S310 that the pre-air-conditioning is not being performed (NO in step S310), or when ECU 90C determines in step S340 that the pre-air-conditioning is not set for cooling (NO in step S340), ECU 90C performs power control to charge power storage device 12 using both of the contact charging and the non-contact charging (step S360).

As described above, in Embodiment 4, when the pre-air-conditioning is set for heating, the contact charging which generates a relatively large heat is performed to supplement a reduction in charging power caused by the pre-air-conditioning. Thereby, the heating effect due to heat generation caused by the contact charging can be expected. On the other hand, when the pre-air-conditioning is set for cooling, the non-contact charging which generates a relatively small heat is performed to supplement a reduction in charging power caused by the pre-air-conditioning. Thereby, the cooling effect is not significantly inhibited. Therefore, according to Embodiment 4, the pre-air-conditioning can be performed efficiently.

It is noted that Embodiments 1 to 4 described above can be combined with each other.

Further, controls performed by ECUs 90, 90A to 90C in Embodiments 1 to 4 described above can be performed in ECU 145 of power supply apparatus 100, because vehicle 10 and power supply apparatus 100 can transmit and receive information bi-directionally, through wired communication by first communication device 60 and third communication device 125 and wireless communication by second communication device 95 and fourth communication device 150.

Further, the invention according to each of Embodiments 1 to 3 described above is also applicable to a power reception apparatus other than a vehicle. For example, it is also applicable to a personal digital assistance, a home electric appliance, and the like.

Further, although electric power is transmitted from power transmission unit 140 of power supply apparatus 100 to power reception unit 70 of vehicle 10 in the non-contact manner by resonating power transmission unit 140 and power reception unit 70 by an electromagnetic field in the above description, electric power may be transmitted from power transmission unit 140 to power reception unit 70 in the non-contact manner by electromagnetic induction. When electric power is transmitted between power transmission unit 140 and power reception unit 70 by electromagnetic induction, coupling coefficient κ between power transmission unit 140 and power reception unit 70 has a value close to 1.0.

It is noted that, in the above description, charging inlet 40 and charger 45 form one embodiment of a "first power reception unit" in the present invention, and power reception unit 70 corresponds to one embodiment of a "second power reception unit" in the present invention. Further, ECU 90 (90A to 90C) corresponds to one embodiment of a "control unit" in the invention of a vehicular power reception device.

In addition, EVSE 115 and connector 120 form one embodiment of a "first power transmission unit" in the present invention, and power transmission unit 140 corresponds to one embodiment of a "second power transmission unit" in the present invention. Further, ECU 145 corresponds to one embodiment of a "control unit" in the invention of a power supply apparatus.

It should be understood that the embodiments disclosed herein are illustrative and non-restrictive in every respect. The scope of the present invention is defined by the scope of the claims, rather than the above description of the embodiments, and is intended to include any modifications within the scope and meaning equivalent to the scope of the claims.

REFERENCE SIGNS LIST

10: vehicle; 12: power storage device; 15: SMR; 20: PCU; 25: motive power output device; 30: drive wheel; 40: charging inlet; 45: charger; 50: first charging relay; 60: first communication device; 70: power reception unit; 75: rectifier; 80: sensor unit; 85: second charging relay; 90, 145: ECU; 95: second communication device; 100: power supply apparatus; 110, 130: outside power source; 115: EVSE; 120: connector; 125: third communication device; 135: matching box; 140: power transmission unit; 150: fourth communication device; 170, 170A to 170C: charging power control unit; 172: contact charging control unit; 174: non-contact charging control unit; 176: alignment control unit; 178: SOC calculation unit; 180: full charging control unit; 182: pre-air-conditioning control unit; 210: AC/DC conversion unit; 215: DC/AC conversion unit; 220: insulating transformer; 225: rectification unit; 235: CCID; 240: CPLT control device; 310, 315: variable capacitor; 320, 330, 340: coil; 335, 350: capacitor; 355: relay; 360: adjustment resistor; 365, 370: voltage sensor; 375: current sensor; PL1, PL2: positive electrode line; NL1, NL2: negative electrode line; L1 to L6: power line.

The invention claimed is:

1. A vehicular power reception device for receiving electric power from a power source outside a vehicle, comprising:
a first power reception unit receiving the electric power from said power source via a power line;
a second power reception unit receiving the electric power from said power source in a non-contact manner; and
a control unit controlling first electric power indicative of the electric power received by said first power reception unit and second electric power indicative of the electric power received by said second power reception unit such that the electric power received from said power source does not exceed electric power receivable by said vehicle,
wherein said control unit controls said first electric power and said second electric power based on a sum of said first electric power and said second electric power.

2. The vehicular power reception device according to claim 1, wherein said control unit controls said first electric power and said second electric power such that the sum of said first electric power and said second electric power does not exceed a predetermined limitation.

3. The vehicular power reception device according to claim 2, wherein, when a sum of electric power receivable by said first power reception unit and electric power receivable by said second power reception unit is less than or equal to said predetermined limitation, said control unit controls said first electric power and said second electric power to receive the electric power from said power source using both of said first and second power reception units.

4. The vehicular power reception device according to claim 2, wherein, when a sum of electric power receivable by said first power reception unit and electric power receivable by said second power reception unit exceeds said predetermined limitation, said control unit controls said first electric power and said second electric power to limit one of power reception by said first power reception unit and power reception by said second power reception unit which is less efficient.

5. The vehicular power reception device according to claim 2, further comprising a power storage device charged by said first electric power and said second electric power,
wherein said predetermined limitation is allowable input power indicative of electric power inputtable to said power storage device.

6. The vehicular power reception device according to claim 2, wherein said predetermined limitation is set based on electric power receivable from said power source.

7. The vehicular power reception device according to claim 1, wherein, when power reception using both of said first and second power reception units is requested, said control unit starts power reception by said second power reception unit prior to power reception by said first power reception unit.

8. The vehicular power reception device according to claim 1, wherein, when power reception using both of said first and second power reception units is requested, said control unit starts power reception by said second power reception unit after preparation for the power reception by said second power reception unit is completed and before preparation for the power reception by said first power reception unit is completed.

9. The vehicular power reception device according to claim 1, further comprising a power storage device charged by said first electric power and said second electric power, wherein said control unit performs full charging control in which charging power for said power storage device is reduced when a state of charge of said power storage device reaches a predetermined amount indicating that said state of charge comes close to a fully charged state, and limits power reception by said second power reception unit when performing said full charging control.

10. The vehicular power reception device according to claim 1, further comprising an electrically powered air-conditioning device capable of performing pre-air-conditioning which conditions air in a vehicle interior before a user uses said vehicle,
wherein, during heating by said pre-air-conditioning, said control unit performs power reception by said first power reception unit.

11. The vehicular power reception device according to claim 1, further comprising an electrically powered air-conditioning device capable of performing pre-air-conditioning which conditions air in a vehicle interior before a user uses said vehicle,
wherein, during cooling by said pre-air-conditioning, said control unit performs power reception by said second power reception unit.

12. The vehicular power reception device according to claim 1, wherein
said power source includes a power transmission unit transmitting electric power to said second power reception unit in the non-contact manner, and
a difference between a natural frequency of said second power reception unit and a natural frequency of said power transmission unit is less than or equal to ±10% of the natural frequency of said second power reception unit or the natural frequency of said power transmission unit.

13. The vehicular power reception device according to claim 1, wherein
said power source includes a power transmission unit transmitting electric power to said second power reception unit in the non-contact manner, and
a coupling coefficient between said second power reception unit and said power transmission unit is less than or equal to 0.1.

14. The vehicular power reception device according to claim 1, wherein
said power source includes a power transmission unit transmitting electric power to said second power reception unit in the non-contact manner,
said second power reception unit receives the electric power from said power transmission unit through at least one of a magnetic field and an electric field, said magnetic field being formed between said second power reception unit and said power transmission unit, said electric field being formed between said second power reception unit and said power transmission unit, and
said magnetic field and said electric field are formed between said second power reception unit and said power transmission unit, and oscillate at a specific frequency.

15. A power supply apparatus for supplying electric power to a vehicle, comprising:
a first power transmission unit transmitting the electric power to said vehicle via a power line;
a second power transmission unit transmitting the electric power to said vehicle in a non-contact manner; and
a control unit controlling first electric power indicative of the electric power transmitted by said first power transmission unit and second electric power indicative of the electric power transmitted by said second power transmission unit such that the electric power transmitted to said vehicle does not exceed electric power receivable by said vehicle,
wherein said control unit controls said first electric power and said second electric power based on a sum of said first electric power and said second electric power.

16. The power supply apparatus according to claim 15, wherein said control unit controls said first electric power and said second electric power such that the sum of said first electric power and said second electric power does not exceed a predetermined limitation.

17. The power supply apparatus according to claim 16, wherein, when a sum of electric power transmittable by said first power transmission unit and electric power transmittable by said second power transmission unit is less than or equal to said predetermined limitation, said control unit controls said first electric power and said second electric power to transmit the electric power to said vehicle using both of said first and second power transmission units.

18. The power supply apparatus according to claim 16, wherein, when a sum of electric power transmittable by said first power transmission unit and electric power transmittable by said second power transmission unit exceeds said predetermined limitation, said control unit controls said first electric power and said second electric power to limit one of power transmission by said first power transmission unit and power transmission by said second power transmission unit which is less efficient.

19. The power supply apparatus according to claim 15, wherein, when power transmission using both of said first and second power transmission units is requested, said control unit starts power transmission by said second power transmission unit prior to power transmission by said first power transmission unit.

20. The power supply apparatus according to claim 15, wherein, when power transmission using both of said first and second power transmission units is requested, said control unit starts power transmission by said second power transmission unit after preparation for the power transmission by said second power transmission unit is completed and before preparation for the power transmission by said first power transmission unit is completed.

21. The power supply apparatus according to claim 15, wherein
said vehicle includes
a power storage device charged by said first electric power and said second electric power, and
a full charging control unit performing full charging control in which charging power for said power storage device is reduced when a state of charge of said power storage device reaches a predetermined amount indicating that said state of charge comes close to a fully charged state, and
said control unit limits power transmission by said second power transmission unit when said full charging control is performed.

22. The power supply apparatus according to claim 15, wherein
said vehicle includes a power reception unit receiving electric power from said second power transmission unit in the non-contact manner, and
a difference between a natural frequency of said second power transmission unit and a natural frequency of said power reception unit is less than or equal to ±10% of the natural frequency of said second power transmission unit or the natural frequency of said power reception unit.

23. The power supply apparatus according to claim 15, wherein
said vehicle includes a power reception unit receiving electric power from said second power transmission unit in the non-contact manner, and
a coupling coefficient between said second power transmission unit and said power reception unit is less than or equal to 0.1.

24. The power supply apparatus according to claim 15, wherein
said vehicle includes a power reception unit receiving electric power from said second power transmission unit in the non-contact manner,
said second power transmission unit transmits the electric power to said power reception unit through at least one of a magnetic field and an electric field, said magnetic field being formed between said second power transmission unit and said power reception unit, said electric field being formed between said second power transmission unit and said power reception unit, and said magnetic field and said electric field are formed between said second power transmission unit and said power reception unit, and oscillate at a specific frequency.

25. An electric power transfer system transferring electric power from a power supply apparatus to a vehicle, comprising:
a first power transmission/reception unit for transferring the electric power from said power supply apparatus to said vehicle via a power line;
a second power transmission/reception unit for transferring the electric power from said power supply apparatus to said vehicle in a non-contact manner; and
a control unit controlling first electric power indicative of the electric power transferred by said first power transmission/reception unit and second electric power indicative of the electric power transferred by said second power transmission/reception unit such that the electric power transferred from said power supply apparatus to said vehicle does not exceed electric power receivable by said vehicle,
wherein said control unit controls said first electric power and said second electric power based on a sum of said first electric power and said second electric power.

* * * * *